United States Patent
Ogawa

(10) Patent No.: US 9,313,865 B2
(45) Date of Patent: Apr. 12, 2016

(54) CONTROL METHOD OF MOBILE DEVICE

(71) Applicant: Panasonic Intellectual Property Corporation of America, Torrance, CA (US)

(72) Inventor: Kento Ogawa, Osaka (JP)

(73) Assignee: PANASONIC INTELLECTUAL PROPERTY CORPORATION OF AMERICA, Torrance, AZ (US)

( * ) Notice: Subject to any disclaimer, the term of this patent is extended or adjusted under 35 U.S.C. 154(b) by 27 days.

(21) Appl. No.: 14/534,011

(22) Filed: Nov. 5, 2014

(65) Prior Publication Data
US 2015/0145435 A1 May 28, 2015

(30) Foreign Application Priority Data
Nov. 28, 2013 (JP) .................................. 2013-246754

(51) Int. Cl.
| | |
|---|---|
| H05B 37/02 | (2006.01) |
| G06F 3/0485 | (2013.01) |
| H05B 33/08 | (2006.01) |
| G06F 3/0484 | (2013.01) |
| G06F 3/0481 | (2013.01) |
| G06F 3/0482 | (2013.01) |

(52) U.S. Cl.
CPC ............ *H05B 37/029* (2013.01); *G06F 3/0482* (2013.01); *G06F 3/0485* (2013.01); *G06F 3/04817* (2013.01); *G06F 3/04842* (2013.01); *G06F 3/04847* (2013.01); *H05B 33/0863* (2013.01); *H05B 37/0272* (2013.01)

(58) Field of Classification Search
USPC .......... 315/294, 297, 291, 307, 308, 312, 363
See application file for complete search history.

(56) References Cited

U.S. PATENT DOCUMENTS

| | | |
|---|---|---|
| 2011/0035029 A1 | 2/2011 | Yianni et al. |
| 2013/0068832 A1 | 3/2013 | Li et al. |

FOREIGN PATENT DOCUMENTS

| | | |
|---|---|---|
| EP | 2519081 | 10/2012 |
| EP | 2651190 | 10/2013 |
| GB | 2494537 | 3/2013 |
| JP | 2011-519128 | 6/2011 |
| WO | 2006/100650 | 9/2006 |

OTHER PUBLICATIONS

The Extended European Search Report dated Apr. 28, 2015 for the related European Patent Application No. 14190565.3.

*Primary Examiner* — Douglas W Owens
*Assistant Examiner* — Jonathan Cooper
(74) *Attorney, Agent, or Firm* — Greenblum & Bernstein, P.L.C.

(57) ABSTRACT

A control method of a mobile device that controls one or more pieces of lighting equipment that illuminate a space includes: displaying a scene configuration screen that includes a configuration screen for configuring a new scene, and a configuration finish button; transmitting to the one or more pieces of lighting equipment a control signal based on configuration information indicating a lighting state configured by user operations on the configuration screen; activating the image capture unit after the configuration finish button is selected; storing in memory the configuration information from when the configuration finish button was selected as configuration information for the new scene, and also storing an image acquired by the image capture unit as a scene icon of the new scene; and displaying a new scene selection screen that includes the scene icon of the new scene.

18 Claims, 23 Drawing Sheets

FIG. 2

| | SCENE NAME | SCENE ICON | LIGHTING EQUIPMENT CONFIGURATION INFORMATION ||||||||||
| | | | A || B || C || D || E ||
| | | | BRIGHTNESS | COLOR | BRIGHTNESS | COLOR | BRIGHTNESS | COLOR | BRIGHTNESS | COLOR | BRIGHTNESS | COLOR |
|---|---|---|---|---|---|---|---|---|---|---|---|---|
| 1 | PARTY | 00001.jpg | 100 | 5000K | 100 | | 100 | | 80 | | 0 | 3500K |
| 2 | DINING | 00002.jpg | 30 | 3500K | 100 | | 100 | | 10 | | 0 | 3500K |
| 3 | RELAXING | 00003.jpg | 50 | 2800K | 10 | | 10 | | 0 | | 0 | 3500K |
| 4 | COZY | 00004.jpg | 100 | 5000K | 0 | | 0 | | 0 | | 0 | 3500K |
| 5 | LOW-POWER | 00005.jpg | 50 | 4500K | 50 | | 30 | | 30 | | 0 | 3500K |
| 6 | GOOD NIGHT | 00006.jpg | 0 | 3500K | 10 | | 10 | | 10 | | 10 | 2800K |
| 7 | THEATER | 00007.jpg | 0 | 2800K | 10 | | 10 | | 0 | | 0 | 3500K |

FIG. 4

| | PART NUMBER | LIGHTING EQUIPMENT NAME | CONFIGURATION PARAMETERS | |
|---|---|---|---|---|
| A | P00001 | LIVING ROOM CEILING LIGHT | BRIGHTNESS | COLOR TONE |
| B | P00002 | DINING ROOM LIGHT | BRIGHTNESS | |
| C | P00003 | KITCHEN DOWNLIGHT | BRIGHTNESS | |
| D | P00004 | HALLWAY DOWNLIGHT | BRIGHTNESS | |
| E | P00005 | BEDROOM CEILING LIGHT | BRIGHTNESS | COLOR TONE |

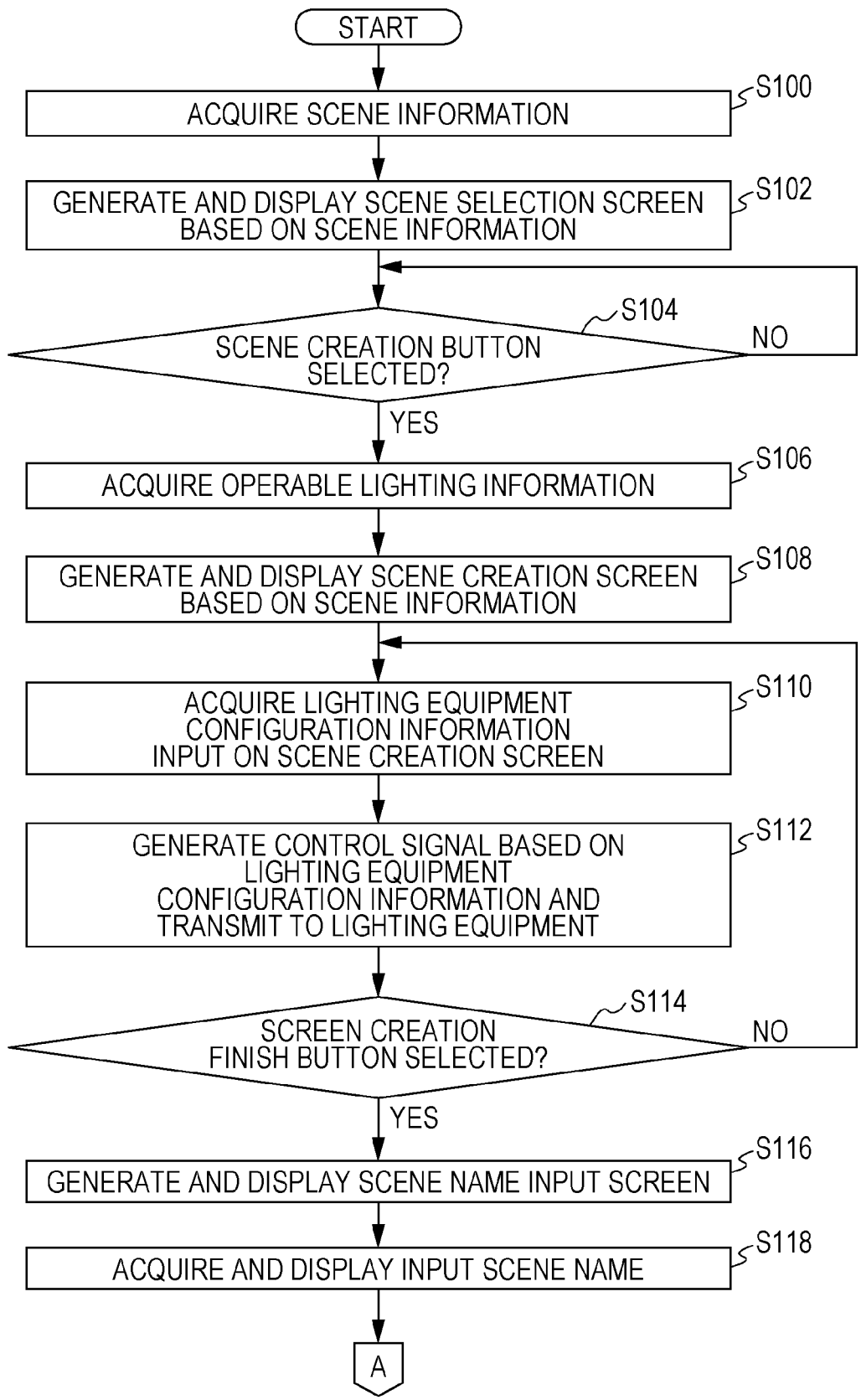

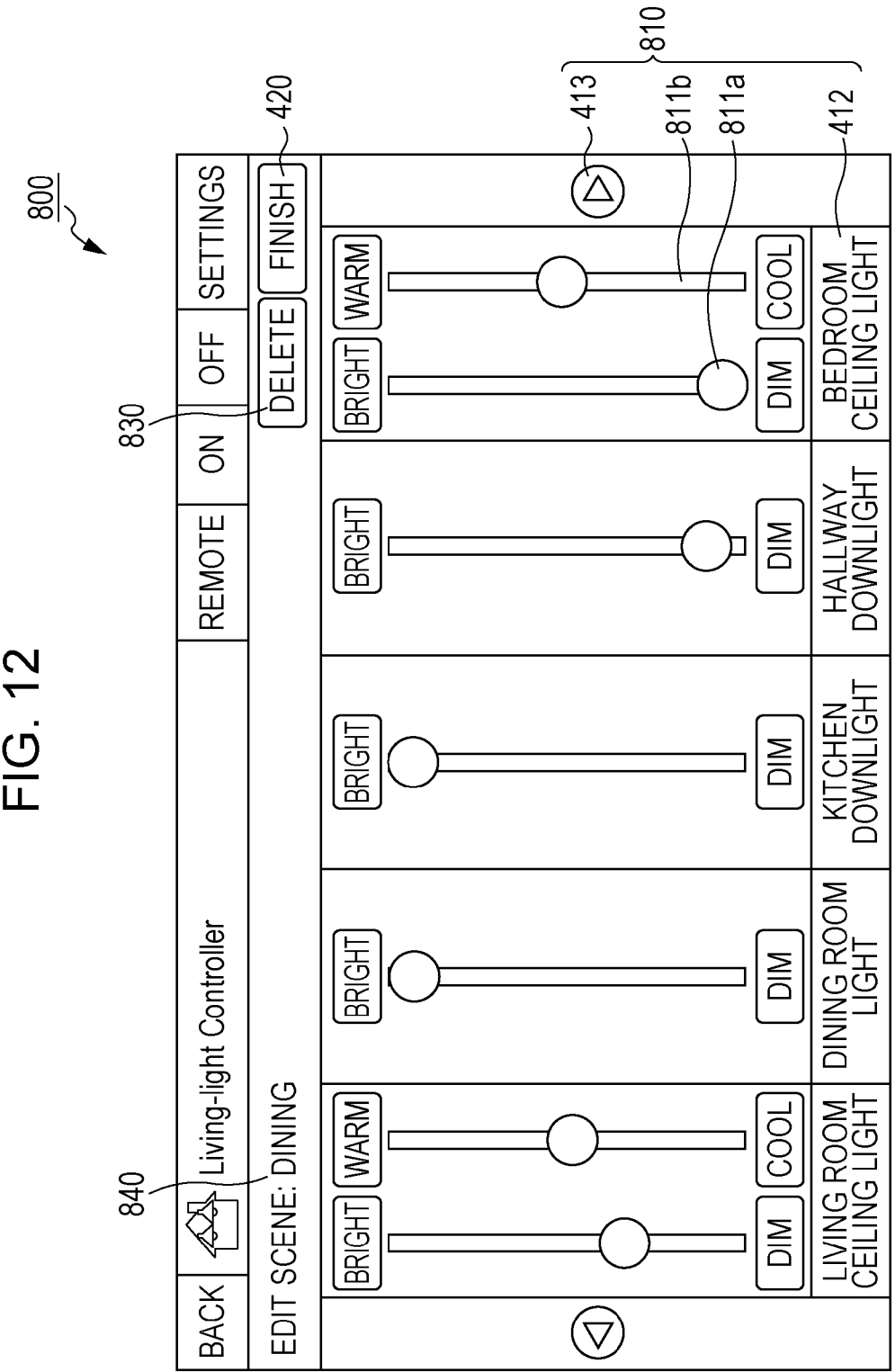

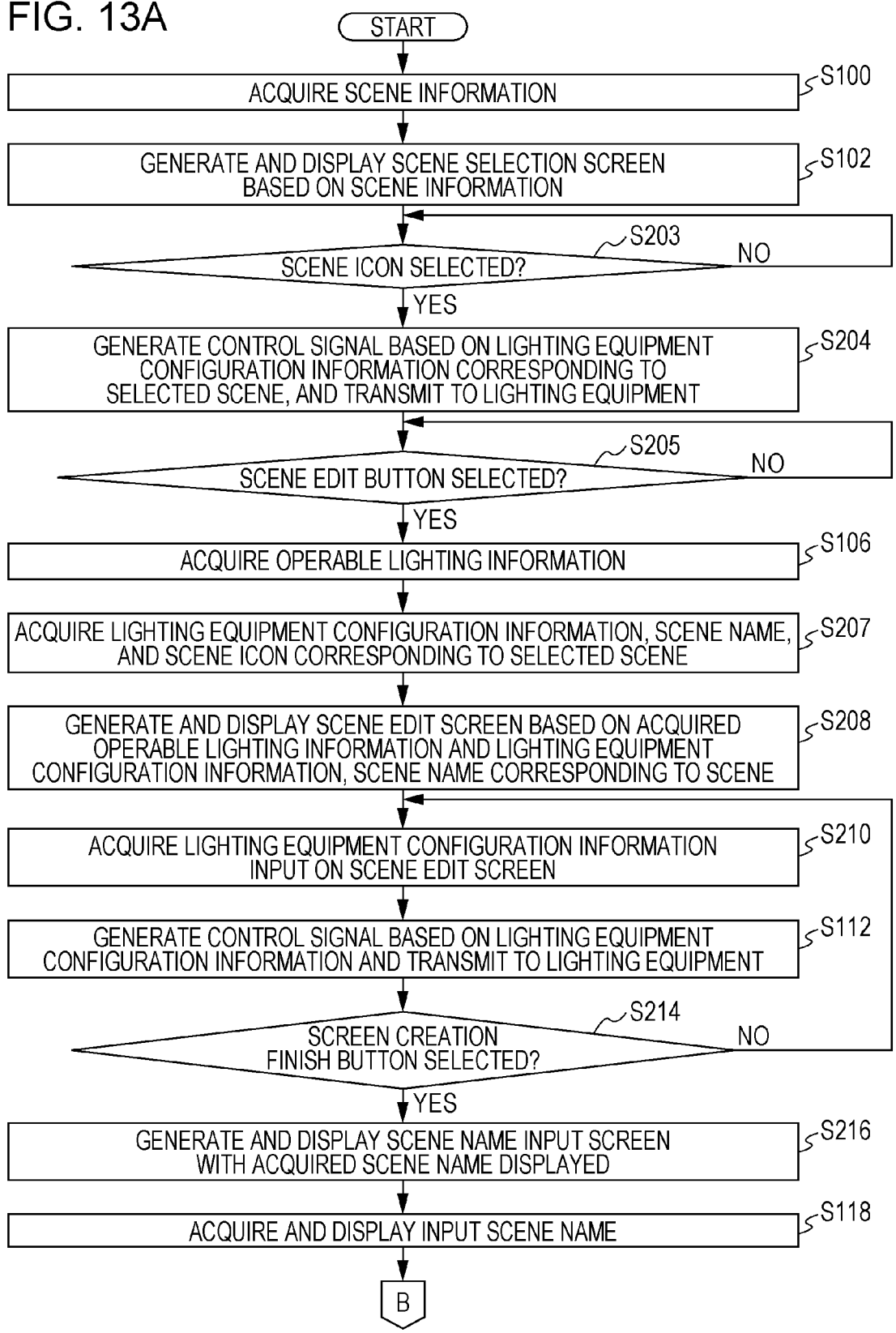

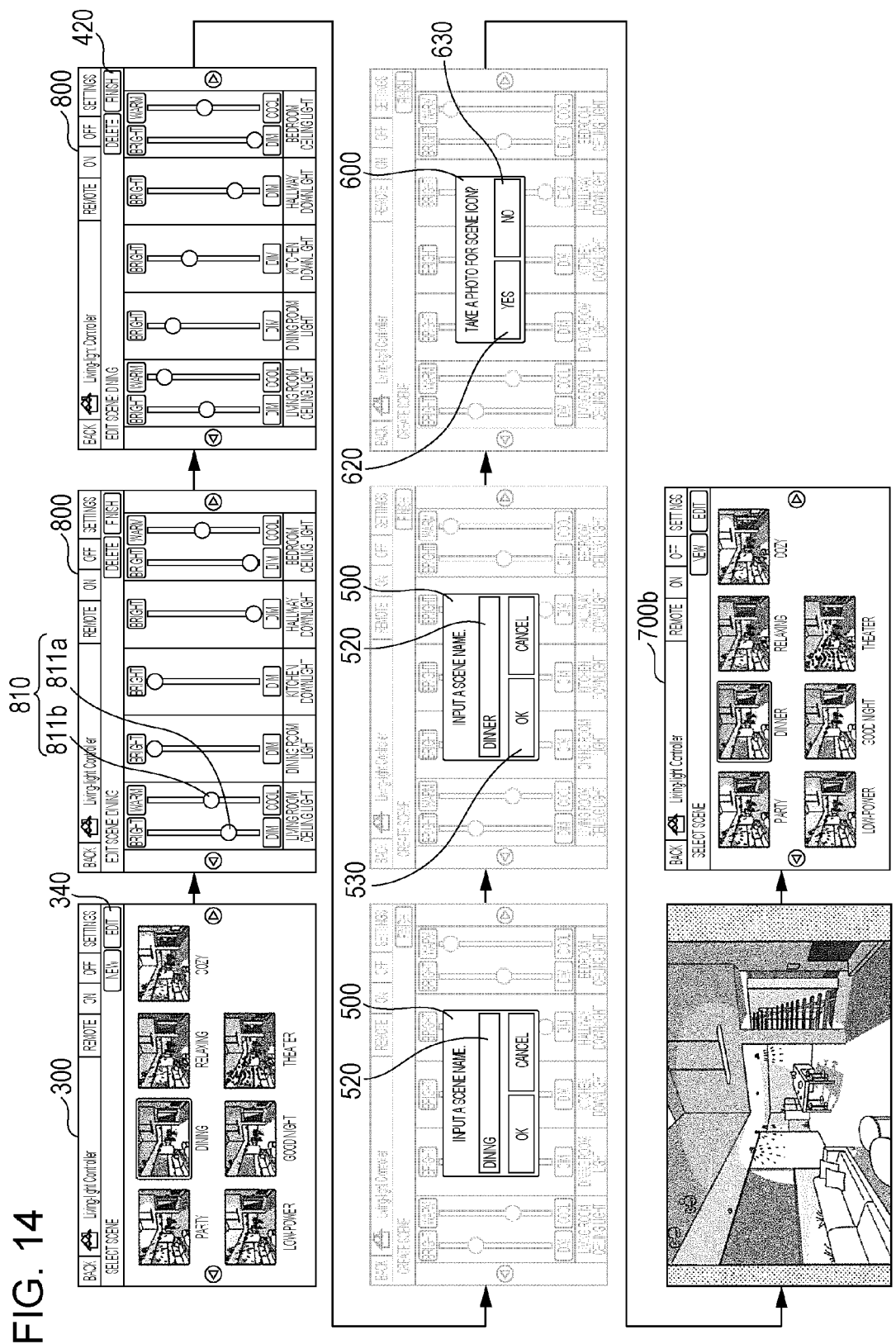

CONTROL METHOD OF MOBILE DEVICE

BACKGROUND OF THE INVENTION

1. Field of the Invention

The present disclosure relates to a control method of a mobile device that controls lighting equipment that illuminates a space.

2. Description of the Related Art

The related art discloses a lighting system controller that creates a lighting scene by adjusting with sliders the brightness and color of light emitted by lighting equipment, and controls the lighting equipment on the basis of a created scene (see Japanese Unexamined Patent Application Publication (Translation of PCT Application) No. 2011-519128).

SUMMARY OF THE INVENTION

However, Japanese Unexamined Patent Application Publication (Translation of PCT Application) No. 2011-519128 requires further improvement. In one general aspect, the techniques disclosed here feature a control method of a mobile device that controls one or more pieces of lighting equipment that illuminate a space, the mobile device including a display unit and an image capture unit, and the control method of the mobile device causing a computer of the mobile device to execute: displaying on the display unit a scene selection screen including one or more scene icons corresponding to one or more scenes indicating one or more lighting states by the one or more pieces of lighting equipment, and a scene configuration button; if one scene icon is selected from among the one or more scene icons, transmitting to the one or more pieces of lighting equipment a control signal for controlling the one or more pieces of lighting equipment so that the space is illuminated in the lighting state indicated by the scene corresponding to the selected scene icon; if the scene configuration button is selected, displaying on the display unit a scene configuration screen that includes a configuration screen for configuring a new scene indicating a new lighting state by the one or more pieces of lighting equipment, and a configuration finish button; transmitting to the one or more pieces of lighting equipment a control signal for controlling the one or more pieces of lighting equipment on the basis of configuration information indicating a lighting state configured by user operations on the configuration screen; activating the image capture unit after the configuration finish button is selected; storing the configuration information from when the configuration finish button was selected in memory as configuration information for the new scene, and in addition, if an image is acquired by the image capture unit, storing the image in the memory as a scene icon of the new scene; and displaying on the display unit a new scene selection screen that includes the scene icon of the new scene.

These general and specific aspects may be implemented using a system, a method, and a computer program, and any combination of systems, methods, and computer programs.

According to an aspect of the present disclosure, further improvements may be realized.

BRIEF DESCRIPTION OF THE DRAWINGS

FIG. 2 is a diagram illustrating an example of scene information according to Embodiment 1;

FIG. 4 is a diagram illustrating an example of operable lighting information according to Embodiment 1;

FIG. 10A is a flowchart illustrating part of an example of a scene creation method according to Embodiment 1;

FIG. 12 is a diagram illustrating an example of a scene editing screen according to Embodiment 2;

FIG. 13A is a flowchart illustrating part of an example of a scene editing method according to Embodiment 2;

FIG. 14 is a diagram illustrating an example of screen transitions displayed in the scene editing method according to Embodiment 2;

DESCRIPTION OF THE PREFERRED EMBODIMENTS (Findings that form the basis of the invention)

The inventors discovered that the following problem occurs with the lighting system controller described in the Description of the Related Art.

In the above lighting system controller of the related art, a created scene and a scene name are recorded in association with each other. When the user attempts to select a scene, scene names are displayed on a display. Consequently, by selecting a scene name display on the display, the user is able to control lighting equipment on the basis of a created in advance.

However, by only looking at a scene name the user may be unable to check what kind of scene corresponds to that scene name. For example, if a long period of time has elapsed between when a scene was created and when a scene is to be selected, the user may have forgotten what kind of scene was created in some cases. Also, if multiple scenes are registered, the user may no longer know which scene name corresponds to which scene.

In these cases, the user must successively check the atmosphere of each actual scene created by the lighting equipment by selecting the scene names displayed on the display one by one. In other words, the user is required to select a scene name and check the atmosphere of the actual scene for every scene name until a desired scene is selected.

In this way, in the above lighting system controller of the related art, the atmosphere of a scene cannot be checked until a scene is actually selected, and burdensome labor is imposed on the user. Accordingly, there is demand for technology that enables the atmosphere of a scene to be checked easily.

Hereinafter, exemplary embodiments will be described specifically with reference to the drawings.

Note that the exemplary embodiments described hereinafter all illustrate general or specific examples. Features such as numerical values, shapes, materials, structural elements, layout positions and connection states of structural elements, steps, and the ordering of steps indicated in the following exemplary embodiments are merely examples, and are not intended to limit the present disclosure. In addition, among the structural elements in the following exemplary embodiments, structural elements that are not described in the independent claim indicating the broadest concept are described as arbitrary or optional structural elements.

(Embodiment 1)

Figure 1:
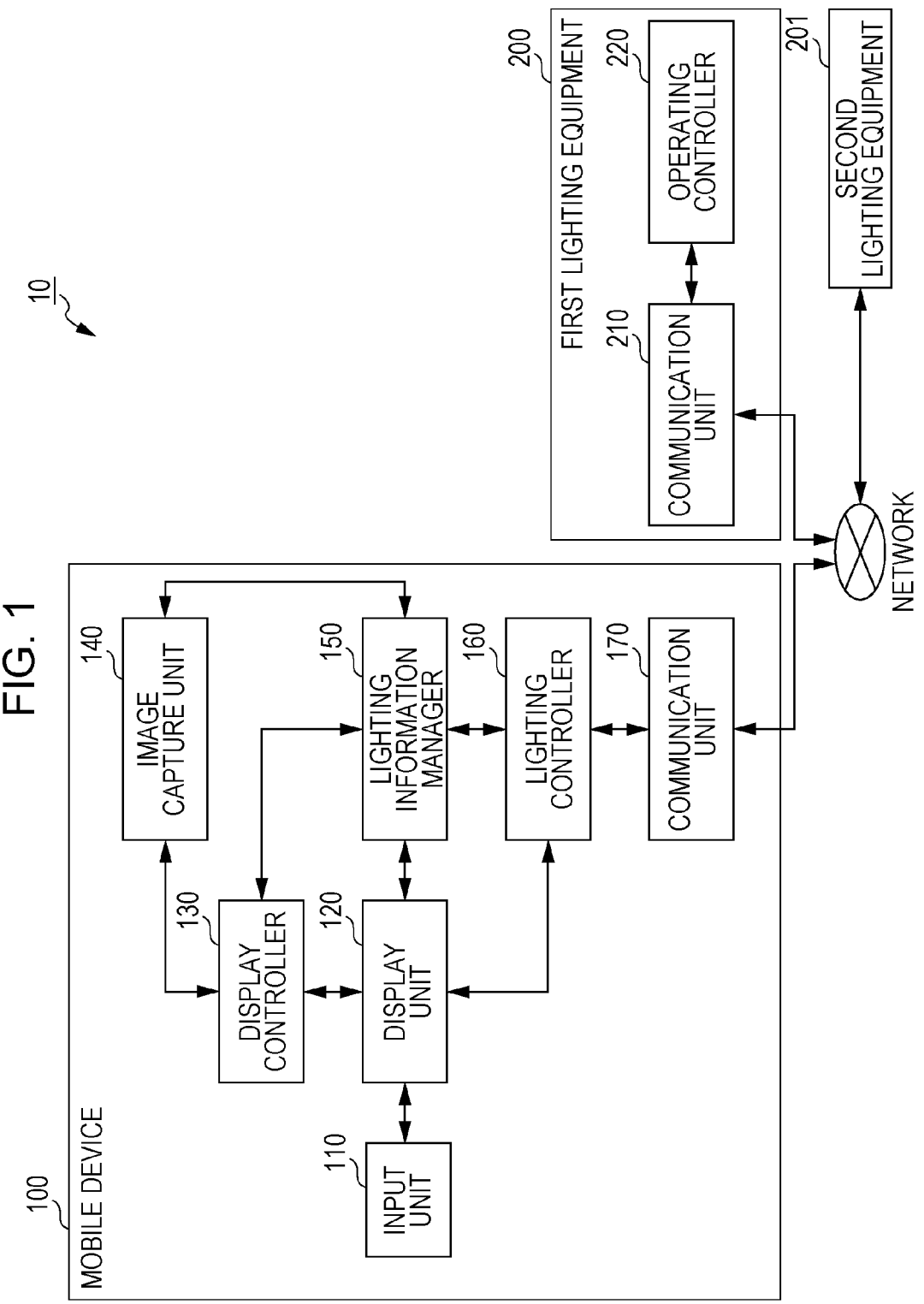
FIG. 1 is a block diagram illustrating an example of a lighting system according to Embodiment 1.

First, a functional configuration of a lighting system according to Embodiment 1 will be described using FIG. 1. FIG. 1 is a block diagram illustrating a lighting system 10 according to Embodiment 1.

As illustrated in FIG. 1, the lighting system 10 is equipped with a mobile device 100, first lighting equipment 200, and second lighting equipment 201. The mobile device 100 is connected to the first lighting equipment 200 and the second lighting equipment 201 via a network.

Next, the configuration of the mobile device 100 will be described.

The mobile device 100 is an example of a device that controls one or more pieces of lighting equipment that illuminate a space. Specifically, the mobile device 100 controls factors such as the turning on, turning off, brightness, and color tone of one or more pieces of lighting equipment (in the example illustrated in FIG. 1, the first lighting equipment 200 and the second lighting equipment 201).

The mobile device 100 is equipped with a display and a camera function. For example, the mobile device 100 may be a mobile information terminal such as a smartphone or mobile phone, a tablet, or a personal digital assistant (PDA).

As illustrated in FIG. 1, the mobile device 100 is equipped with an input unit 110, a display unit 120, a display controller 130, an image capture unit 140, a lighting information manager 150, a lighting controller 160, and a communication unit 170.

The input unit 110 accepts operating input from a user. For example, the input unit 110 accepts operating input such as scene selection and configuration from a user. Specifically, the input unit 110 accepts an operation on a graphical user interface (GUI) component (widget) displayed by the display unit 120. The input unit 110 outputs information based on an operation by the user to components such as the display controller 130, the lighting information manager 150, and the lighting controller 160.

For example, the input unit 110 detects the user pressing a push-button displayed by the display unit 120. Also, the input unit 110 acquires a configuration value configured as a result of the user operating a slider displayed by the display unit 120. Additionally, the input unit 110 acquires text input by the user into a text box displayed by the display unit 120.

For example, the input unit 110 may be various sensors, such as the capacitive sensors of a touchscreen (touch panel). In other words, the input unit 110 realizes the input function of the touchscreen. Specifically, the input unit 110 accepts a user operation on a GUI component displayed on the touchscreen. More specifically, the input unit 110 detects the press of a push-button or the operation of a slider displayed on the touchscreen, or alternatively, acquires information such as text input via a software keyboard. Note that the input unit 110 may also be a physical button provided on the mobile device 100.

The display unit 120 displays a screen (image) generated by the display controller 130. For example, the display unit 120 displays screens such as a scene selection screen, a scene configuration screen, a scene name input screen, and an image capture confirmation screen. Each screen includes a GUI component operable by the user. Note that specific examples of screens displayed by the display unit 120 will be described later.

For example, the display unit 120 is a liquid crystal display or an organic electro-luminescence (OEL) display. Specifically, the display unit 120 realizes the display function of a touchscreen (touch panel).

The display controller 130 generates a screen to be displayed by the display unit 120. Specifically, the display controller 130 generates screens such as a scene selection screen, a scene configuration screen, a scene name input screen, and an image capture confirmation screen. The display controller 130 causes the display unit 120 to display respectively generated screens.

Specifically, the display controller 130 generates a scene selection screen on the basis of scene information managed by the lighting information manager 150. Also, the display controller 130 generates a scene configuration screen on the basis of operable lighting information managed by the lighting information manager 150.

For example, the display controller 130 is realized by components such as a central processing unit (CPU), read-only memory (ROM), and random access memory (RAM).

The image capture unit 140 realizes a camera function for acquiring a captured image. Specifically, the image capture unit 140 is activated after a finish configuration button for a new scene is selected. An image acquired by the image capture unit 140 is managed by the lighting information manager 150 as a scene icon.

For example, the image capture unit 140 is a camera unit. Specifically, the image capture unit 140 includes components such as an optical lens and an image sensor. The image capture unit 140 converts light incident via the optical lens into an image signal using the image sensor, and outputs the image signal.

Note that activation of the image capture unit 140 refers to a state enabling image capture by the image capture unit 140. For example, activation may refer to a state that enables an image to be acquired by pressing a shutter button. Specifically, activation refers to launching application software for acquiring an image. For example, activation refers to a live preview image and a shutter button being displayed by the display unit 120.

The lighting information manager 150 manages scene information and operable lighting information. Scene information is information indicating one or more scenes. Operable lighting information is information indicating one or more pieces of lighting equipment controllable by the mobile device 100. Scene information and operable lighting information will be described later.

For example, the lighting information manager 150 may be memory such as RAM or non-volatile memory. Note that the lighting information manager 150 may also be removable memory that is inserted into or removed from the mobile device 100.

The lighting controller 160 generates a control signal for controlling one or more pieces of lighting equipment (the first lighting equipment 200 and the second lighting equipment 201). The lighting controller 160 transmits a generated control signal to one or more pieces of lighting equipment via the communication unit 170. For example, the lighting controller 160 is realized by components such as a CPU, ROM, and RAM.

A control signal is generated for each piece of lighting equipment, and includes configuration parameters in accordance with the functions of the corresponding lighting equipment, as well as configured values for the configuration parameters, for example. Specifically, the control signal includes information indicating information such as a configured value of a brightness function (brightness ratio) or a configured value of a color tone function (color temperature).

The communication unit 170 transmits a control signal generated by the lighting controller 160 to one or more pieces of lighting equipment connected via a network.

For example, the communication unit 170 is a communication interface such as a wireless local area network (WLAN) module, a Bluetooth (registered trademark) module, or a near field communication (NFC) module. Note that the communication unit 170 may also be a wired LAN port or the like.

Next, the one or more pieces of lighting equipment controlled by the mobile device 100 will be described.

The first lighting equipment 200 and the second lighting equipment 201 are examples of the one or more pieces of lighting equipment. The first lighting equipment 200 and the second lighting equipment 201 include at least one of a brightness function and a color tone function, for example. Note that the first lighting equipment 200 and the second lighting equipment 201 may be different types of lighting equipment, or the same type of lighting equipment.

The first lighting equipment 200 and the second lighting equipment 201 are placed at different positions within a space, for example. The first lighting equipment 200 and the second lighting equipment 201 are arranged to be able to illuminate the same space from different directions.

Herein, the same space is a space made up of a "living room", a "dining room", and a "hallway", for example. For example, the first lighting equipment 200 may be a "living room ceiling light" that primarily illuminates the "living room", while the second lighting equipment 201 may be a "dining room light" that primarily illuminates the "dining room".

Note that the first lighting equipment 200 and the second lighting equipment 201 may also not be placed strictly within the same space. In other words, the one or more pieces of lighting equipment may also include lighting equipment that illuminates a different space. For example, the first lighting equipment 200 may be a "living room ceiling light" placed in the "living room", while the second lighting equipment 201 may be a "bedroom ceiling light" placed in a "bedroom".

As illustrated in FIG. 1, the first lighting equipment 200 is equipped with a communication unit 210 and an operating controller 220. Note that, although not illustrated in the drawings, the second lighting equipment 201 similarly is equipped with a communication unit 210 and an operating controller 220.

The communication unit 210 receives a control signal transmitted from the mobile device 100. Note that the communication unit 210 may also receive a control signal transmitted from the communication unit 170 of the mobile device 100 via communication equipment such as a bridge or router.

For example, the communication unit 210 is a communication interface such as a WLAN module, a Bluetooth (registered trademark) module, or an NFC module. Note that the communication unit 210 may also be a wired LAN port or the like.

The operating controller 220 adjusts the brightness and the color of the first lighting equipment 200 on the basis of a control signal received by the communication unit 210. For example, the operating controller 220 adjusts the brightness and the color tone so that the brightness and color of the light emitted by the first lighting equipment 200 reaches configured values included in the control signal.

As above, in the lighting system 10 according to the present embodiment, factors such as brightness and color are adjusted in the first lighting equipment 200 and the second lighting equipment 201 on the basis of a control signal transmitted from the mobile device 100. In this way, in the present embodiment, the mobile device 100 controls one or more pieces of lighting equipment, thereby enabling adjustment of the lighting state of a space.

Next, screens generated by the display controller 130 and displayed by the display unit 120 will be described using FIGS. 2 to 9.

Figure 3:
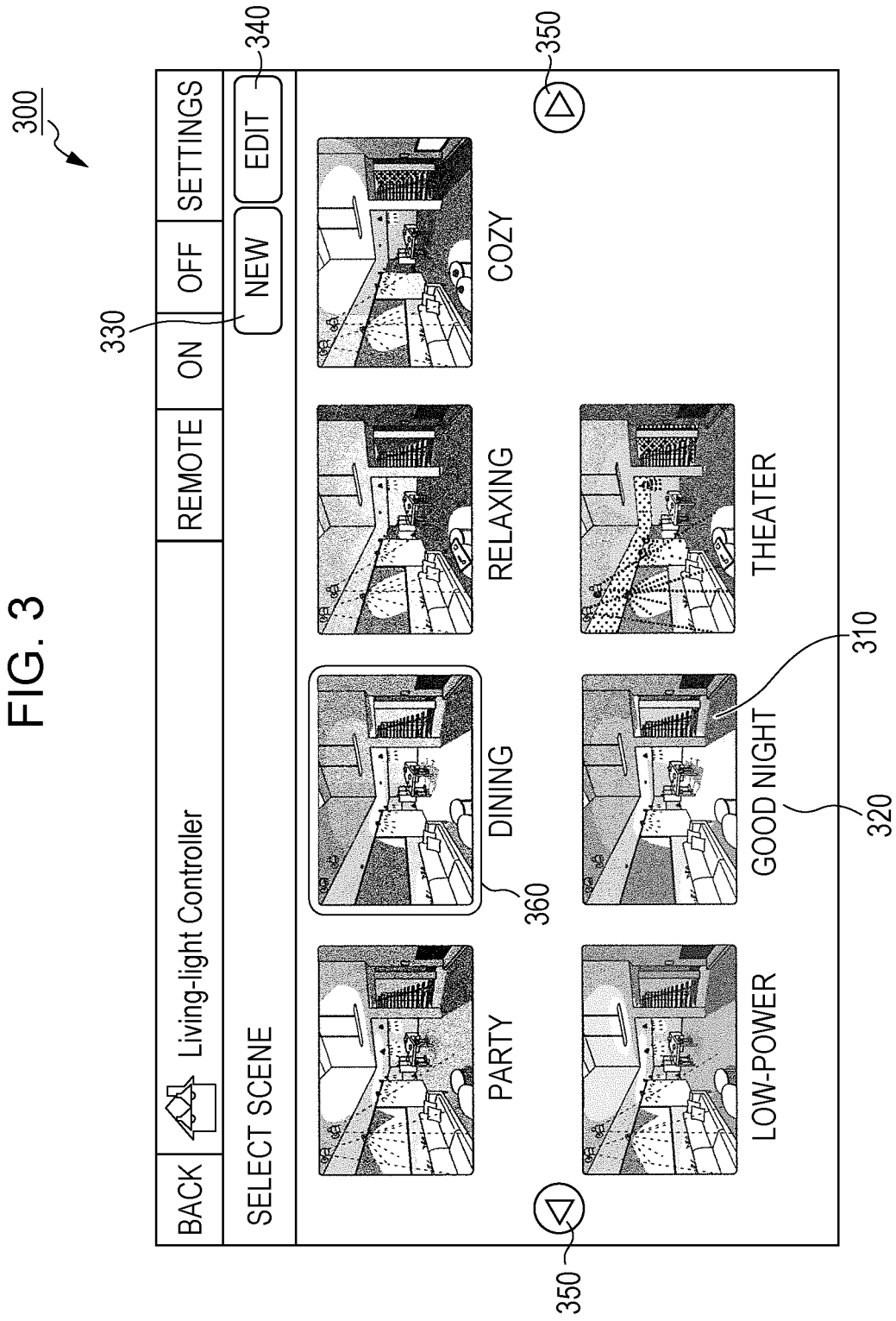
FIG. 3 is a diagram illustrating an example of a scene selection screen according to Embodiment 1.

First, FIGS. 2 and 3 will be used to describe the scene information managed by the lighting information manager 150, and a scene selection screen generated on the basis of the scene information. FIG. 2 is a diagram illustrating an example of scene information according to Embodiment 1. FIG. 3 is a diagram illustrating a scene selection screen 300 according to Embodiment 1.

Scene information is information indicating one or more scenes. The one or more scenes are lighting states by one or more pieces of lighting equipment, and indicate one or more lighting states for a space. One lighting state is associated with one scene.

The space is a space illuminated by one or more pieces of lighting equipment. For example, the space is the space inside one or more rooms in which one or more pieces of lighting equipment are installed. As an example, the space may be a space made up of a "living room", a "dining room", and a "hallway".

As illustrated in FIG. 2, the scene information includes a scene name, a scene icon, and lighting equipment configuration information. For a single scene, a scene name, a scene icon, and lighting equipment configuration information are associated together. In other words, the lighting information manager 150 manages a scene name, a scene icon, and lighting equipment configuration information in association with each scene.

The scene name is a user-configured name for identifying a scene. Specifically, the scene name is text input by the user via a scene name input screen discussed later. As illustrated in FIG. 2, the user may configure as the scene name a name that enables the user himself or herself to easily imagine the lighting state, such as "party" or "dining". For this reason, the user is able to easily infer the atmosphere of a scene.

The scene icon is an image acquired by the image capture unit 140. For example, the image may be an image acquired by capturing an image of the space illuminated by the one or more pieces of lighting equipment. In the example illustrated in FIG. 2, there is a one-to-one correspondence between scenes and scene icons. Note that, instead of an image acquired by the image capture unit 140, a predetermined default image may be registered as a scene icon in some cases.

The configuration information is information indicating a lighting state configured by the user on a scene configuration screen discussed later. Specifically, the configuration information is information indicating configuration parameters for each of one or more pieces of lighting equipment, as well as configured values for the configuration parameters. For example, since the lighting equipment includes at least one of a brightness function and a color tone function, the configuration information includes at least one of brightness configuration information and color tone configuration information for each of the one or more pieces of lighting equipment.

The brightness function is a function that adjusts the brightness of light emitted from lighting equipment. The configured value of the brightness function (brightness ratio) is indicated by a value from 0 to 100, for example. As the brightness ratio increases, the brightness of light emitted from the lighting equipment increases. A brightness ratio of "0" means that the lighting equipment is turned off, whereas a brightness ratio of "100" means that the lighting equipment is turned on at maximum power.

The color tone function is a function that adjusts the color of light emitted from lighting equipment. Specifically, the color tone function is a function that adjusts the color temperature of light. The configured value of the color tone function (color temperature) is indicated by a value from 2100K to 5000K, for example. At lower color temperatures, the color becomes warmer, whereas at higher color temperatures, the color becomes cooler. For example, an "incandescent light bulb color" has a color temperature of approximately 2800K, while a "warm white color" has a color temperature of approximately 3500K, and a "daylight" color has a color temperature of approximately 5000K.

Note that the one or more pieces of lighting equipment may also include lighting equipment that includes only an ON/OFF function. In this case, that lighting equipment may be handled as lighting equipment whose brightness ratio may be configured to the values of "0" and "100" only.

If a new scene different from the existing scenes is configured, that scene is registered in the scene information as a new scene. At this point, if a new scene is newly created, a scene name, scene icon, and configuration information for the new scene are added and registered in the scene information. For example, in the example illustrated in FIG. 2, a new scene may be registered as scene "No. 8". New scene creation will be later described in detail.

On the other hand, if a new scene is configured by editing an existing scene, a scene name, scene icon, and configuration information for the new scene are registered in place of the scene name, scene icon, and configuration information for the existing scene. New scene editing will be later described in detail in Embodiment 2.

On the basis of scene information like the above, a scene selection screen is generated. Specifically, the display controller 130 generates and causes the display unit 120 to display the scene selection screen 300 illustrated in FIG. 3, on the basis of the scene information illustrated in FIG. 2.

The scene selection screen 300 is a screen enabling the user to select one scene from among one or more scenes. In addition, the scene selection screen 300 includes a scene configuration button for configuring a new scene.

As illustrated in FIG. 3, the scene selection screen 300 includes one or more scene icons 310, scene names 320, a create button 330, an edit button 340, and scroll buttons 350.

The one or more scene icons 310 have a one-to-one correspondence with one or more scenes. Each scene icon 310 is an image acquired by the image capture unit 140. Specifically, each scene icon 310 is an image acquired by capturing an image of the space illuminated in the lighting state indicated by the corresponding scene.

Each scene icon 310 is selectable by the user. In other words, a scene icon 310 is selected as a result of the user's finger or the like touching the touchscreen. If the input unit 110 detects that a scene icon 310 has been selected, the input unit 110 reports information indicating the selected scene icon 310 to the display controller 130 and the lighting controller 160.

Herein, as illustrated in FIG. 3, the scene icon 310 indicating "dining" is enclosed by a predetermined frame 360. This means that the scene icon 310 indicating "dining" is currently selected, and means that the space is illuminated in the lighting state corresponding to the scene icon 310 indicating "dining".

Note that the method of indicating that a scene icon 310 has been selected is not limited to the above. For example, the selected scene icon 310 may also be highlighted or made to blink. The scene name 320 corresponding to the selected scene icon 310 may also be displayed in bold.

Each scene name 320 is displayed below the corresponding scene icon 310. Note that it is sufficient for the scene name 320 to be displayed near the scene icon 310. For example, the scene name 320 may also be displayed to the left, to the right, or above the scene icon 310. Additionally, the scene name 320 may also be displayed overlaid on top of the scene icon 310.

Note that the scene name 320 may also not be displayed. Also, if the scene name 320 is being displayed, not only the scene icon 310 but also the scene name 320 may be selectable.

The create button 330 and the edit button 340 are examples of scene configuration buttons. The create button 330 is a button for creating a new scene, while the edit button 340 is a button for editing an existing scene.

The create button 330 and the edit button 340 are examples of GUI components, and may be push-buttons, for example. When the create button 330 or the edit button 340 is selected by the user, the scene creation screen or the scene editing screen discussed later is displayed by the display unit 120. Specifically, if the input unit 110 detects the press of the create button 330 or the edit button 340, the display controller 130 generates and causes the display unit 120 to display the scene creation screen or the scene editing screen.

Note that Embodiment 1 describes the case of the create button 330 being selected. The case of the edit button 340 being selected will be described in Embodiment 2.

The scroll buttons 350 are buttons for changing the displayed scene icons 310. In other words, the scroll buttons 350 are buttons that switch the display of the scene icons 310. For example, if there are more scenes configured than the maximum number of scenes that may be displayed on the scene selection screen 300, by selecting the scroll buttons 350, the user is able to display the scene icon of another scene on the scene selection screen 300, and select that scene.

The scroll buttons 350 are examples of GUI components, and may be push-buttons, for example. Note that the scroll buttons 350 may also be a scrollbar or the like, rather than push-buttons.

In the example illustrated in FIG. 3, eight scene icons 310 are being displayed on the scene selection screen 300. At this point, in the case in which 10 scenes have been configured, if the input unit 110 detects the press of a scroll button 350, the display controller 130 generates and displays a scene selection screen 300 including scene icons corresponding to the two remaining scenes.

Specifically, the scroll buttons 350 are page-turning buttons. For example, if a scroll button 350 is selected, the display controller 130 changes the screen depicting eight scene icons to the screen depicting two scene icons.

Alternatively, if a scroll button 350 is selected, the display controller 130 may also cause the scene icons to be changed by a given number of one or more scene icons. For example, if the scroll button 350 on the right side is selected, the display controller 130 may remove the "party" scene icon, shift over the seven remaining scenes, and display another scene icon.

Figure 5:
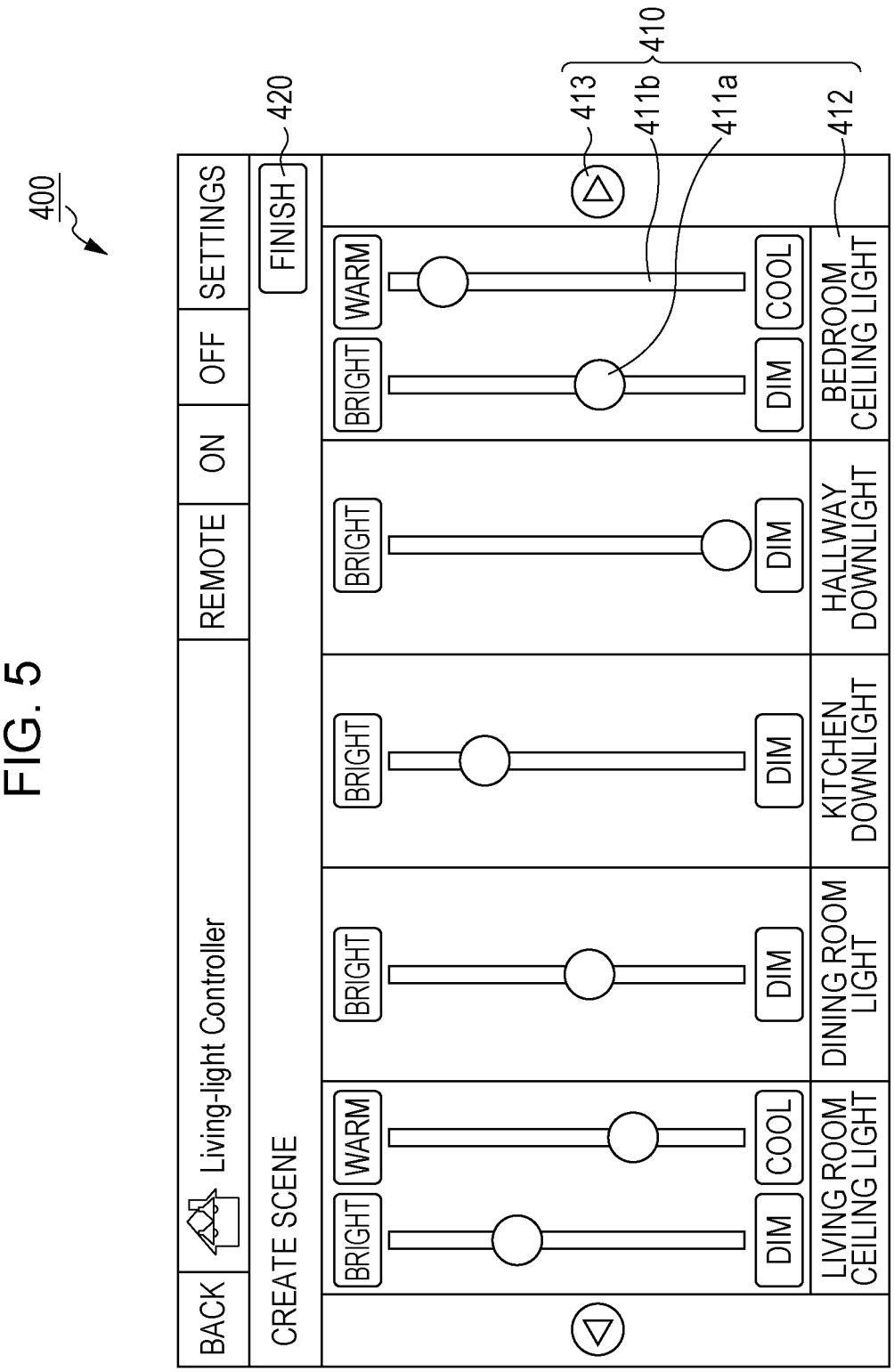
FIG. 5 is a diagram illustrating an example of a scene creation screen according to Embodiment 1.

Next, the operable lighting information managed by the lighting information manager 150 and the scene creation screen generated on the basis of the operable lighting information will be described using FIGS. 4 and 5. FIG. 4 is a diagram illustrating an example of operable lighting information according to Embodiment 1. FIG. 5 is a diagram illustrating a scene creation screen 400 according to Embodiment 1.

The operable lighting information is information indicating one or more pieces of lighting equipment controllable by the mobile device 100.

As illustrated in FIG. 4, the operable lighting information includes a part number (model number), a lighting equipment name, and configuration parameters. A part number, lighting equipment name, and configuration parameters are associated with one piece of lighting equipment. In other words, the lighting information manager 150 manages a part number, a lighting equipment name, and configuration parameters in association with each piece of lighting equipment.

The part number (model number) is information indicating the type of lighting equipment. Specifically, the part number is an identification code prescribed on the basis of features such as the power consumption, shape, and functionality of the lighting equipment.

The lighting equipment name is a user-configured name for identifying a piece of lighting equipment. As illustrated in FIG. 4, the user may configure a name that enables the user himself or herself to easily distinguish features such as the installation position of the lighting equipment, such as "living room ceiling light" or "dining room light". For this reason, when the user is configuring a scene, the user is able to easily judge which lighting equipment to adjust.

The configuration parameters are information indicating adjustable functions of the lighting equipment. Specifically, the configuration parameters are information indicating features such as the brightness function and the color tone function. As illustrated in FIG. 4, the functions available to each piece of lighting equipment differ.

The operable lighting information is information generated in advance by the user or the like. Also, information related to new lighting equipment may be added to the operable lighting information.

For example, when registering a new piece of lighting equipment as operable lighting equipment, the mobile device 100 may prompt the user to input the part number of the lighting equipment to be registered. Specifically, the mobile device 100 displays a screen for inputting a lighting equipment name, and acquires text input via that screen as a lighting equipment name.

Furthermore, the mobile device 100 may acquire configuration parameters of target lighting equipment by cross-referencing the input part number with a predetermined database. Herein, the predetermined database is a database associating multiple part numbers and configuration parameters, and is saved on a server accessible by the mobile device 100 via a network, or in memory or the like of the mobile device 100 itself, for example.

On the basis of operable lighting information like the above, a scene creation screen is generated. Specifically, the display controller 130 generates and causes the display unit 120 to display the scene creation screen 400 illustrated in FIG. 5, on the basis of the operable lighting information illustrated in FIG. 4.

The scene creation screen 400 is an example of a scene configuration screen, and is a screen for creating a new scene separate from the existing scenes. The scene creation screen 400 is displayed when the create button 330 on the scene selection screen 300 illustrated in FIG. 3 is selected.

As illustrated in FIG. 5, the scene creation screen 400 includes a configuration screen 410, and a finish button 420.

The configuration screen 410 is a screen for configuring a new scene indicating a new lighting state by one or more pieces of lighting equipment. Specifically, the configuration screen 410 is a screen for creating a new scene.

As illustrated in FIG. 5, the configuration screen 410 includes a brightness slider 411a, a color tone slider 411b, a lighting equipment name 412, and scroll buttons 413. For example, the configuration screen 410 includes a lighting equipment name 412 and configuration sliders for each of the one or more pieces of lighting equipment registered in the operable lighting information. At least one of the brightness slider 411a and the color tone slider 411b is displayed as a configuration slider, depending on the configuration parameters corresponding to the lighting equipment, for example.

The brightness slider 411a is an example of a GUI component, and is a slider for configuring the configured value of the brightness function (brightness ratio). In other words, by operating the brightness slider 411a, the user is able to adjust the brightness of light emitted from the corresponding lighting equipment.

For example, the brightness slider 411a may be configured to a brightness ratio value from 0 to 100. In the example illustrated in FIG. 5, the brightness ratio approaches "100" as the brightness slider 411a approaches "Bright", and the light emitted from the lighting equipment becomes brighter. Also, the brightness ratio approaches "0" as the brightness slider 411a approaches "Dim", and the light emitted from the lighting equipment becomes dimmer.

Note that in the case of lighting equipment having only an on/off function, for example, the corresponding brightness slider 411a may only take the two brightness ratio values of "0" and "100".

The color tone slider 411b is an example of a GUI component, and is a slider for configuring the configured value of the color tone function (color temperature). In other words, by operating the color tone slider 411b, the user is able to adjust the color of light emitted from the corresponding lighting equipment.

For example, the color tone slider 411b may be configured to a color temperature from 2100K to 5000K. In the example illustrated in FIG. 5, the color temperature becomes lower as the color tone slider 411b approaches "Warm", and the light emitted from the lighting equipment becomes a warmer color. Also, the color temperature becomes higher as the color tone slider 411b approaches "Cool", and the light emitted from the lighting equipment becomes a cooler color.

Note that in the case of lighting equipment that lacks a color tone function, the color tone slider 411b is not displayed. In other words, which sliders to display for which lighting equipment is decided on the basis of the operable lighting information.

The lighting equipment name 412 is displayed near the corresponding brightness slider 411a and color tone slider 411b. In the example illustrated in FIG. 5, the lighting equipment name 412 is displayed below the sliders, but may also be displayed to the left, to the right, or above. Additionally, the lighting equipment name 412 may also be displayed overlaid on top of the sliders.

The scroll buttons 413 are buttons for changing the displayed lighting equipment sliders. In other words, the scroll buttons 413 are buttons for changing the configurable (operable) lighting equipment. Stated differently, the scroll buttons 413 are buttons that switch the lighting equipment configuration screen. For example, if there are more pieces of operable lighting equipment than the maximum number of pieces of lighting equipment that may be displayed on the configuration screen 410, by selecting the scroll buttons 413, the user is able to display the sliders of other lighting equipment on the configuration screen 410, and select those sliders.

The scroll buttons 413 are examples of GUI components, and may be push-buttons, for example. Note that the scroll buttons 413 may also be a scrollbar or the like, rather than push-buttons.

In the example illustrated in FIG. 5, five lighting equipment names 412 and corresponding sliders (brightness slider 411a and color tone slider 411b) are displayed on the configuration screen 410. At this point, in the case in which seven pieces of lighting equipment are operable, if the input unit 110 detects the press of a scroll button 413, the display controller 130 generates and displays a configuration screen 410 including the lighting equipment names and sliders corresponding to the two remaining pieces of lighting equipment.

Specifically, the scroll buttons 413 are page-turning buttons. For example, if a scroll button 413 is selected, the display controller 130 changes the screen depicting five lighting equipment names 412 and corresponding sliders to the screen depicting two lighting equipment names 412 and corresponding sliders.

Alternatively, if a scroll button 413 is selected, the display controller 130 may also cause the lighting equipment to be changed by a given number of one or more pieces of lighting equipment. For example, if the scroll button 413 on the right side is selected, the display controller 130 may remove the "living room ceiling light" lighting equipment name and sliders, shift over the four remaining lighting equipment names and sliders, and display another lighting equipment name and sliders.

The finish button 420 is an example of a finish configuration button, and is a button for finishing the configuration of one or more pieces of lighting equipment. In other words, the finish button 420 is a button for finishing the configuration of a lighting state by one or more pieces of lighting equipment, and specifically is a button for finishing the configuration of the brightness ratio and color temperature.

The finish button 420 is an example of a GUI component, and may be a push-button, for example. When the finish button 420 is selected by the user, the configuration of the brightness and color tone for one or more pieces of lighting equipment is finished. For example, if the input unit 110 detects the press of the finish button 420, the display controller 130 generates and causes the display unit 120 to display a scene name input screen.

Note that a text box may also be displayed instead of the brightness slider 411a and the color tone slider 411b. The input unit 110 may also acquire numerical values input into the text box as the brightness ratio and color temperature.

As an alternative example, in the case of the brightness ratio, components such as radio buttons, check boxes, a drop-down list, or a list box presenting values such as "0", "20", "40", "60", "80", and "100" as choices may also be displayed. Besides the above, various GUI components may be utilized in the configuration of the brightness and color tone.

Note that the initial position of each slider displayed on the scene creation screen 400 may be a position corresponding to a predetermined default value, or a position corresponding to a configured value indicating the current lighting state of the space. For example, the default values may be "0", "50", "100", or the like for the brightness ratio, and "2100K", "3500K", "5000K", or the like for the color temperature.

Figure 6:
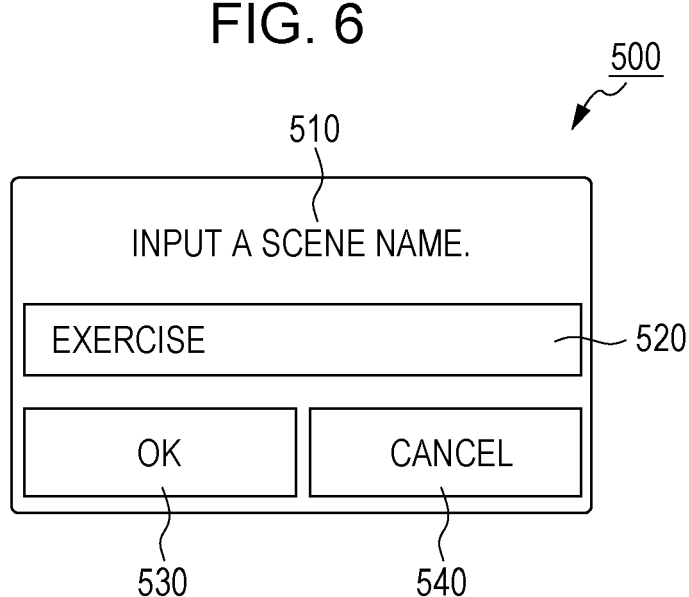
FIG. 6 is a diagram illustrating an example of a scene name input screen according to Embodiment 1.

Next, the scene name input screen generated by the display controller 130 will be described using FIG. 6. FIG. 6 is a diagram illustrating a scene name input screen 500 according to Embodiment 1.

The scene name input screen 500 is a screen enabling the user to input a scene name. The scene name input screen 500 is displayed after the configuration of one or more pieces of lighting equipment is finished. Specifically, the scene name input screen 500 is displayed when the finish button 420 on the scene creation screen 400 illustrated in FIG. 5 is selected.

As illustrated in FIG. 6, the scene name input screen 500 includes a comment 510, a text box 520, an OK button 530, and a cancel button 540.

The comment 510 is text for presenting the operation to be performed by the user. Specifically, the comment 510 is text for prompting the user to input a scene name. For example, as illustrated in FIG. 6, the comment 510 "Input a scene name." is displayed. Note that, instead of the comment 510, the user may be prompted to input a scene name using audio.

The text box 520 is an example of a GUI component, and is an interface enabling the user to input text. Text input by the user is displayed in the text box 520. For example, if the user inputs "Exercise", "Exercise" is displayed in the text box 520, as illustrated in FIG. 6.

Specifically, the input unit 110 acquires text input by the user. Subsequently, the display controller 130 generates and causes the display unit 120 to display a scene name input screen 500 in which the text acquired by the input unit 110 is displayed in the text box 520.

The OK button 530 is an example of a GUI component, and may be a push-button, for example. The OK button 530 is a button enabling the user to confirm that the input of a scene name is finished.

When the OK button 530 is selected, the text input into the text box 520 is stored in memory as a scene name. Specifically, when the input unit 110 detects the press of the OK button 530, the lighting information manager 150 manages the text input into the text box 520 as a scene name.

The cancel button 540 is an example of a GUI component, and may be a push-button, for example. The cancel button 540 is a button enabling the user to confirm that the input of a scene name is to be aborted.

When the cancel button 540 is selected, the scene name input process is aborted, and for example, the display unit 120 displays the scene creation screen 400, and lighting equipment may be reconfigured. Note that the scene creation process may also be aborted when the cancel button 540 is selected. In other words, when the cancel button 540 is selected, the scene selection screen 300 may also be displayed.

Note that although an example is illustrated in which the scene name input screen 500 is displayed when the finish button 420 is selected, the configuration is not limited thereto. For example, the scene name input screen 500 may also be displayed before finishing the configuration of the one or more pieces of lighting equipment. Specifically, the scene name input screen 500 may also be displayed when the create button 330 on the scene selection screen 300 illustrated in FIG. 3 is selected. Alternatively, when the scene creation screen 400 is displayed, the text box 520 may also be displayed at the same time.

Figure 7:
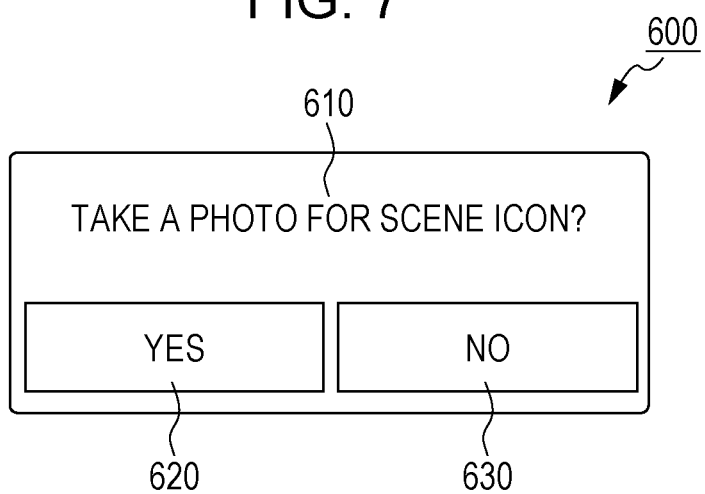
FIG. 7 is a diagram illustrating an example of an image capture confirmation screen according to Embodiment 1.

Next, an image capture confirmation screen generated by the display controller 130 will be described using FIG. 7. FIG. 7 is a diagram illustrating an image capture confirmation screen 600 according to Embodiment 1.

The image capture confirmation screen 600 is a screen for having the user confirm whether or not to capture an image for use as a scene icon. In other words, the image capture confirmation screen 600 is a screen for confirming whether or not to conduct image capture with the image capture unit 140.

The image capture confirmation screen 600 is displayed after the configuration of one or more pieces of lighting equipment is finished. For example, the image capture confirmation screen 600 is displayed after the finish button 420 on the scene creation screen 400 is selected. Specifically, the image capture confirmation screen 600 is displayed when the OK button 530 on the scene name input screen 500 is selected.

As illustrated in FIG. 7, the image capture confirmation screen 600 includes a comment 610, a yes button 620, and a no button 630.

The comment 610 is text for presenting the operation to be performed by the user. Specifically, the comment 610 is text for having the user confirm whether or not to conduct image capture with the image capture unit 140. For example, as illustrated in FIG. 7, the comment 610 "Take a photo for scene icon?" is displayed. Note that, instead of the comment 610, audio may be used to make the user confirm image capture.

The yes button 620 is an example of a GUI component, and may be a push-button, for example. The yes button 620 is an example of an activate button for activating the image capture unit 140, and is a button indicating agreement with the comment 610.

When the yes button 620 is selected, the image capture unit 140 is activated. Specifically, when the input unit 110 detects the press of the yes button 620, the image capture unit 140 enters a state enabling image capture.

The no button 630 is an example of a GUI component, and may be a push-button, for example. The no button 630 is an example of a non-activate button for not activating the image capture unit 140, and is a button indicating disagreement with the comment 610.

When the no button 630 is selected, the image capture unit 140 is not activated. In other words, when the no button 630 is selected, the image capture unit 140 is not activated, and a default image is stored in the memory as a scene icon instead of a captured image. Specifically, when the input unit 110 detects the press of the no button 630 button, the lighting information manager 150 manages a predetermined default image as a scene icon.

Note that although an example is illustrated in which the image capture confirmation screen 600 is displayed when the OK button 530 on the scene name input screen 500 is selected, the configuration is not limited thereto. For example, the image capture confirmation screen 600 may also be displayed when the finish button 420 on the scene creation screen 400 is selected.

Figure 8:
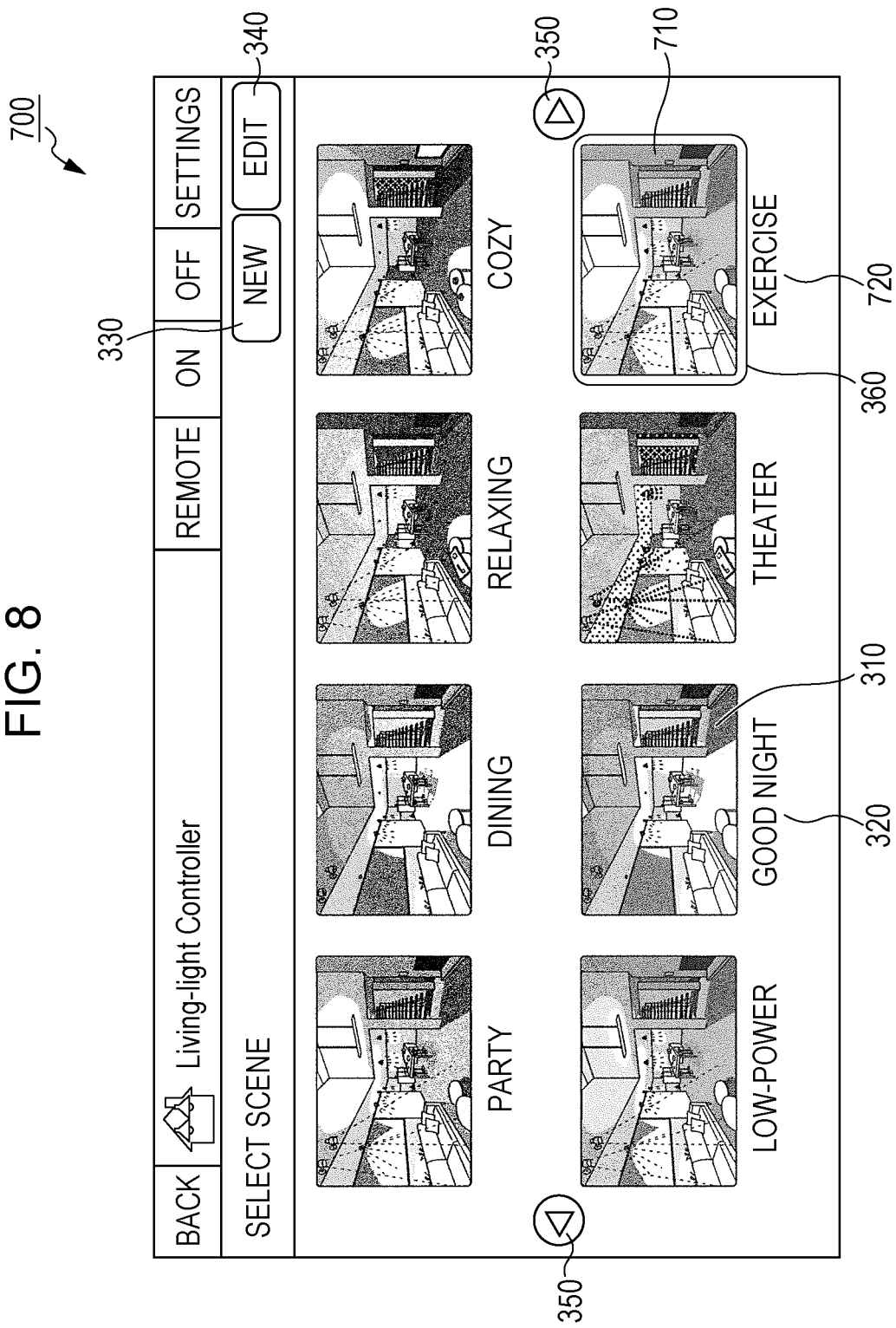
FIG. 8 is a diagram illustrating an example of a new scene selection screen according to Embodiment 1.

Next, a new scene selection screen generated by the display controller 130 will be described using FIG. 8. FIG. 8 is a diagram illustrating a new scene selection screen 700 according to Embodiment 1.

The new scene selection screen 700 is a scene selection screen displayed after finishing the configuration of a new scene. Specifically, the new scene selection screen 700 is a screen in which the scene icon of a new scene has been added to the existing scene selection screen.

The new scene selection screen 700 includes one or more scene icons 310, scene names 320, the scene icon 710 of a new scene, and the scene name 720 of the new scene. For example, the new scene selection screen 700 is displayed when image capture by the image capture unit 140 is finished.

The scene icon 710 is the scene icon of the new scene added to the existing scene selection screen (for example, the scene selection screen 300 illustrated in FIG. 3). Specifically, the scene icon 710 is an image acquired by the image capture unit 140. For example, the scene icon 710 is an image acquired by capturing an image of the space illuminated in the lighting state indicated by the new scene. Specifically, the scene icon 710 is an image acquired by the image capture unit 140 when the yes button 620 on the image capture confirmation screen 600 illustrated in FIG. 7 is selected.

The scene name 720 is the scene name of the new scene. Specifically, the scene name 720 is text input into the text box 520 on the scene name input screen 500 illustrated in FIG. 6.

Note that on the new scene selection screen 700, the scene icon 710 of the new scene is displayed in a selected state. Specifically, as illustrated in FIG. 8, the scene icon 710 of the new scene is enclosed by the frame 360. At this point, the one or more pieces of lighting equipment are illuminating the space in the lighting state indicated by the new scene.

Figure 9:
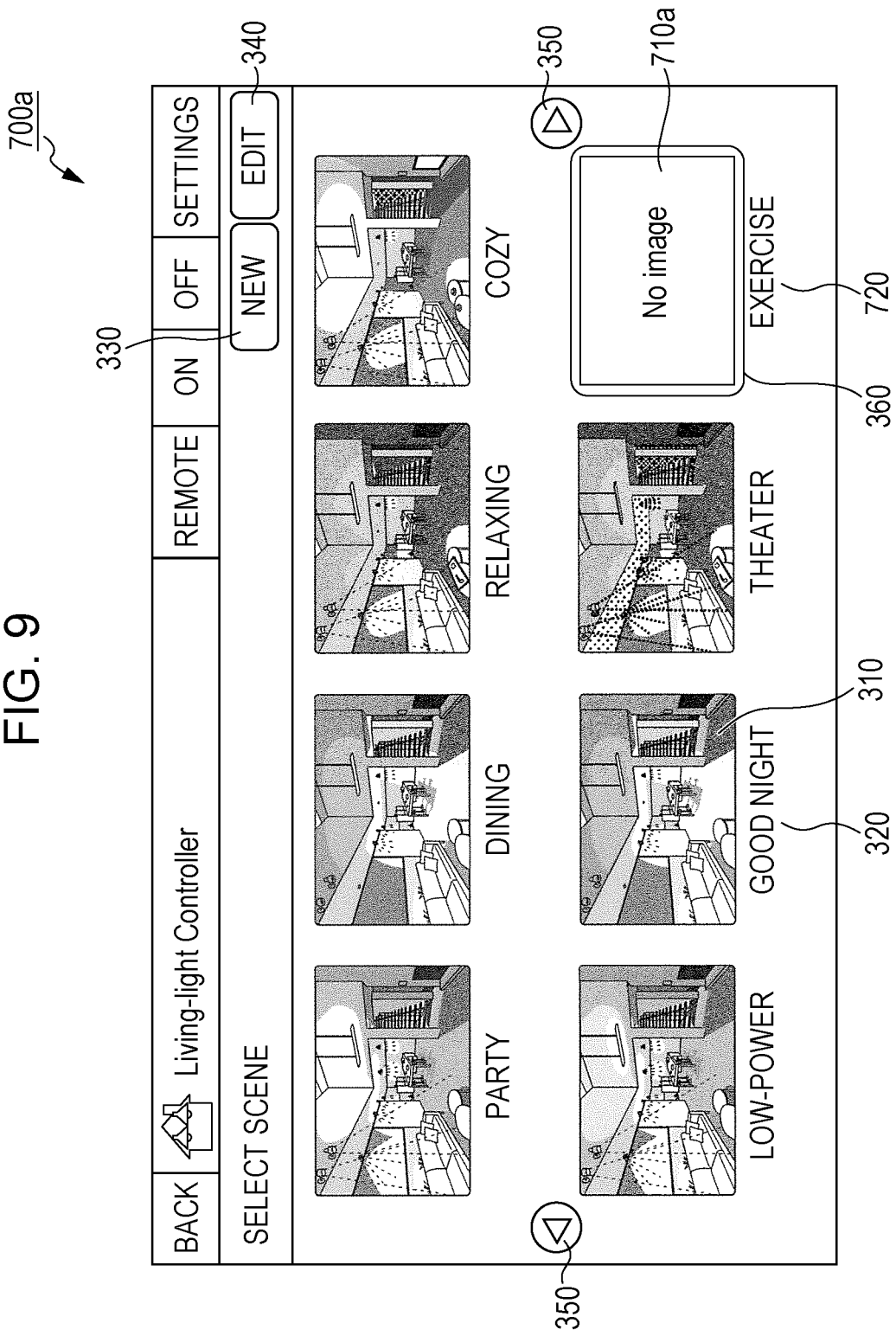
FIG. 9 is a diagram illustrating another example of a new scene selection screen according to Embodiment 1.

Another example of a new scene selection screen generated by the display controller 130 will now be described using FIG. 9. FIG. 9 is a diagram illustrating a new scene selection screen 700a according to Embodiment 1.

The new scene selection screen 700a is a scene selection screen displayed after finishing the configuration of a new scene. Specifically, the new scene selection screen 700a is a screen in which the scene icon of a new scene has been added to the existing scene selection screen.

The new scene selection screen 700a includes the scene icon 710a and scene name 720a of the new scene. For example, the new scene selection screen 700a is displayed when the no button 630 on the image capture confirmation screen 600 illustrated in FIG. 7 is selected.

The scene icon 710a is the scene icon of the new scene added to the existing scene selection screen (for example, the scene selection screen 300 illustrated in FIG. 3). Specifically, the scene icon 710a is the default image.

In this way, if image capture with the image capture unit 140 is not conducted, a default image is displayed as the scene icon 710a of the new scene.

Note that on the new scene selection screen 700a, the scene icon 710a of the new scene is displayed in a selected state. Specifically, as illustrated in FIG. 9, the scene icon 710a of the new scene is enclosed by the frame 360. At this point, the one or more pieces of lighting equipment are illuminating the space in the lighting state indicated by the new scene.

Figure 10B:
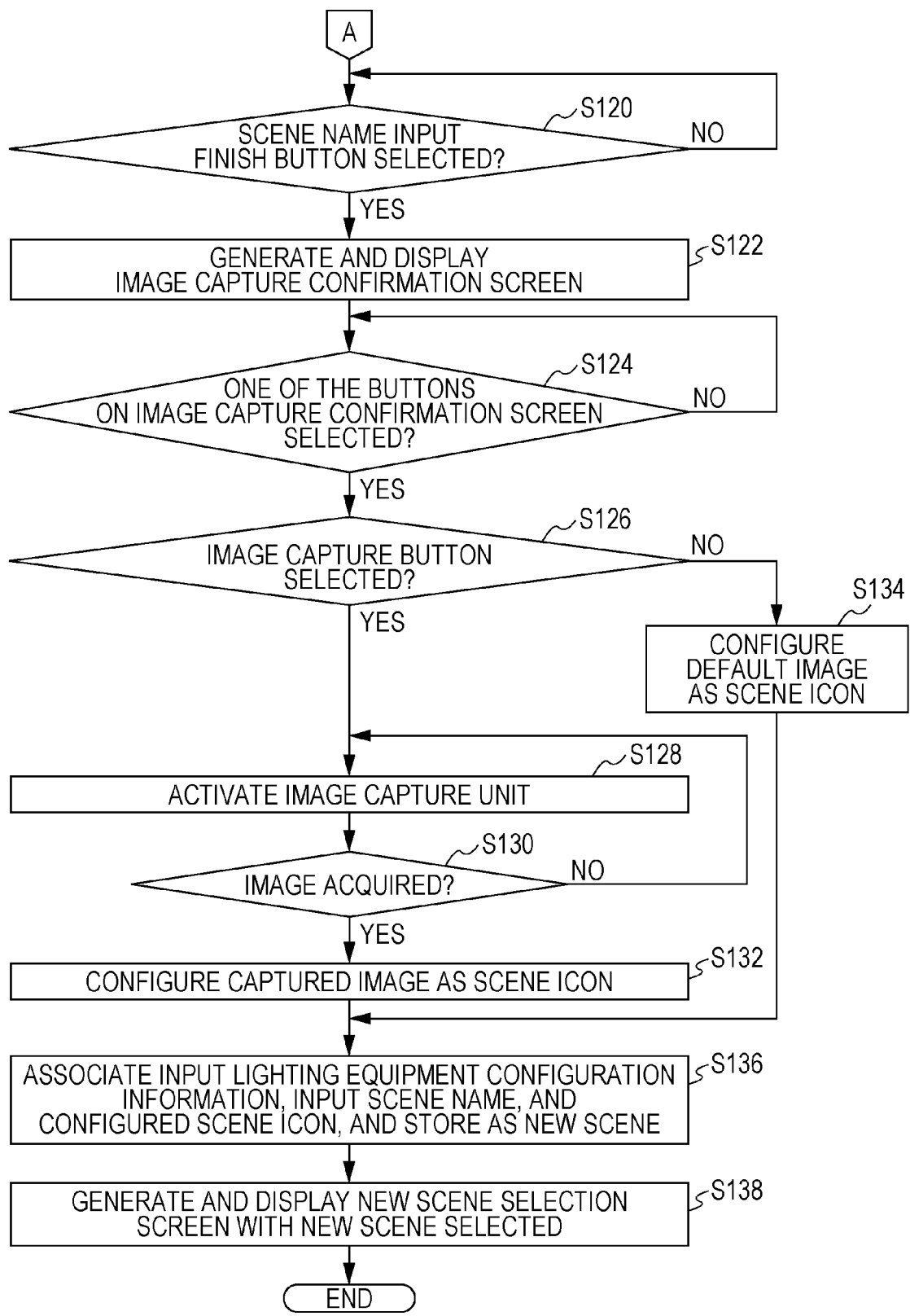
FIG. 10B is a flowchart illustrating the remaining part of an example of a scene creation method according to Embodiment 1.
Figure 11:
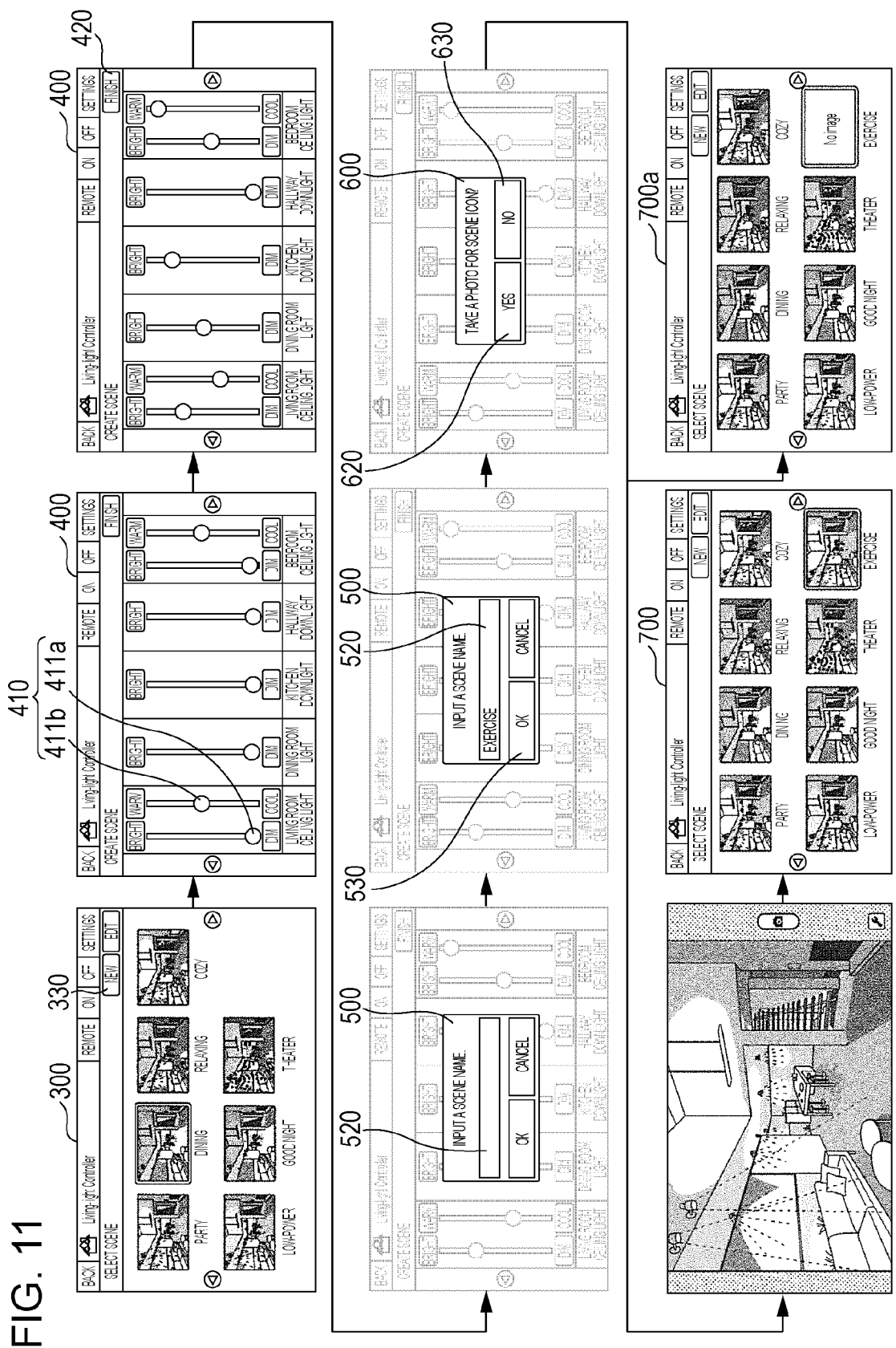
FIG. 11 is a diagram illustrating an example of screen transitions displayed in the scene creation method according to Embodiment 1.

Next, a scene creation method according to Embodiment 1 will be described using FIGS. 10A, 10B, and 11. FIGS. 10A and 10B are flowcharts illustrating an example of a scene creation method according to Embodiment 1. FIG. 11 is a diagram illustrating an example of screen transitions displayed in the scene creation method according to Embodiment 1.

For example, the control method of the mobile device 100 according to the present embodiment is realized by application software or the like for controlling the one or more pieces of lighting equipment. For example, the scene creation method according to Embodiment 1 is started as a result of the application software being activated.

First, the display controller 130 acquires scene information (S100). Specifically, the display controller 130 reads and acquires the scene information being stored in the lighting information manager 150. The scene information is information indicating one or more already-created scenes, as illustrated in FIG. 2, for example.

Next, the display controller 130 generates the scene selection screen 300 on the basis of the acquired scene information, and causes the display unit 120 to display the generated scene selection screen 300 (S102). Consequently, a scene selection screen 300 as illustrated in the top-left part of FIG. 11 is displayed by the display unit 120. The details of the scene selection screen 300 have been described using FIG. 3.

Next, if the scene creation button (create button 330) is selected (S104, Yes), the display controller 130 acquires operable lighting information (S106). Specifically, when the input unit 110 detects the press of the create button 330, the display controller 130 reads and acquires the operable lighting information being stored in the lighting information manager 150. The operable lighting information is information indicating one or more pieces of already-registered lighting equipment, as illustrated in FIG. 4, for example.

Next, the display controller 130 generates the scene creation screen 400 on the basis of the acquired operable lighting information, and causes the display unit 120 to display the generated scene creation screen 400 (S108). Consequently, a scene creation screen 400 as illustrated in the top-middle part of FIG. 11 is displayed by the display unit 120. The details of the scene creation screen 400 have been described using FIG. 5.

Note that if the scene creation button (create button 330) is not selected (S104, No), the display controller 130 stands by until the create button 330 is selected. At this point, if any one of the one or more scene icons 310 is selected, the display controller 130 additionally displays the predetermined frame 360 so as to enclose the selected scene icon. Also, the lighting controller 160 generates a control signal for controlling the one or more pieces of lighting equipment so as to illuminate the space in the lighting state indicated by the scene corresponding to the selected scene icon 310. Subsequently, the lighting controller 160 transmits the generated control signal to the one or more pieces of lighting equipment via the communication unit 170 and the network. Consequently, the space may be illuminated in the lighting state indicated by the selected scene.

Next, the display controller 130 and the lighting controller 160 acquire lighting equipment configuration information input by the user (S110). The scene creation screen 400 is displayed as illustrated in the top-middle part of FIG. 11, thereby enabling the user to set configured values of the brightness function or the color tone function for each of the one or more pieces of lighting equipment. The display controller 130 and the lighting controller 160 acquire configured values indicated by the brightness slider 411a or the color tone slider 411b operated by the user via the input unit 110, for example.

Subsequently, the display controller 130 generates the scene creation screen 400 according to the configured values acquired via the input unit 110, and causes the display unit 120 to display the generated scene creation screen 400. In other words, the display controller 130 continually generates and causes the display unit 120 to display the scene creation screen 400 in synchronization with operations by the user. Specifically, when the user operates a slider, the display of the slider on the scene creation screen 400 is modified according to the user operation. In this way, a modified scene creation screen 400 as illustrated in the top-right part of FIG. 11 is displayed by the display unit 120.

In addition, the lighting controller 160 generates a control signal for controlling the one or more pieces of lighting equipment on the basis of the configuration information indicating the lighting state configured by user operations on the configuration screen (S112). Subsequently, the lighting controller 160 transmits the generated control signal to the one or more pieces of lighting equipment via the communication unit 170 and the network. Consequently, the lighting state produced by the one or more pieces of lighting equipment continually varies in synchronization with user operations.

For example, if the user operates the brightness slider 411a for the "living room ceiling light" from among the one or more pieces of lighting equipment, the brightness of the actual "living room ceiling light" varies according to the user operation. For example, if the user operates the brightness slider 411a so that the brightness ratio of the "living room ceiling light" becomes 100, the "living room ceiling light" illuminates the space at maximum brightness.

The acquisition of configuration information from user operations (S110) and the control of lighting equipment (S112) are repeated until the scene creation finish button (finish button 420) is selected (S114, No).

In this way, the lighting state of the one or more pieces of lighting equipment is modified in synchronization with user operations on the configuration screen 410. Consequently, the user is able to create a desired scene by operating the mobile device 100 while checking the actual atmosphere of the lighting state.

If the scene creation finish button (finish button 420) is selected (S114, Yes), the display controller 130 generates the scene name input screen 500, and causes the display unit 120 to display the generated scene name input screen 500 (S116). Specifically, if the input unit 110 detects the press of the finish button 420, the display controller 130 generates the display unit 500. Consequently, a scene name input screen 500 as illustrated in the middle-left part of FIG. 11 is displayed by the display unit 120. The details of the scene name input screen 500 have been described using FIG. 6.

At this point, when the scene name input screen 500 is displayed, nothing is input into the text box 520. In other words, a blank text box 520 is displayed. The user input a desired scene name into the text box 520.

The input unit 110 acquires text (a scene name) input into the text box 520. Subsequently, the display control unit 130 displays the text acquired by the input unit 110 in the text box 520 (S118). Consequently, a scene name input screen 500 including a text box 520 displaying the text input by the user as illustrated in the center part of FIG. 11 is displayed by the display unit 120.

If the scene name input finish button is selected (S120, Yes), the display controller 130 generates a scene icon image capture confirmation screen 600, and causes the display unit 120 to display the generated image capture confirmation screen 600 (S122). Specifically, if the input unit 110 detects the press of the OK button 530, the display controller 130 generates the image capture confirmation screen 600. Consequently, an image capture confirmation screen 600 as illustrated in the middle-right part of FIG. 11 is displayed by the display unit 120. Note that at this point, the lighting information manager 150 manages the text that was input into the text box 520 when the OK button 530 was selected as the scene name of the new scene.

Note that if the scene name input finish button (OK button 530) is not selected (S120, No), the display controller 130 stands by until the OK button 530 is selected.

Next, the display controller 130 stands by until one of the buttons on the image capture confirmation screen 600 is selected (S124, No). Specifically, the display controller 130 keeps causing the display unit 120 to display the image capture confirmation screen 600 until the input unit 110 detects the press of either the yes button 620 or the no button 630.

In the case in which one of the buttons is selected (S124, Yes), if the selected button is the image capture button (yes button 620) (S126, Yes), the image capture unit 140 is activated (S128). Specifically, if the input unit 110 detects the press of the yes button 620, the display controller 130 activates the image capture unit 140.

As a result of the image capture unit 140 being activated, an image acquired by the image sensor of the image capture unit 140 (a live-view image) is displayed by the display unit 120, as illustrated in the bottom-left part of FIG. 11. The user is able to press the shutter button while viewing the image displayed by the display unit 120. The image capture unit 140 acquires a captured image when the shutter button is pressed.

At the time the image capture unit 140 is activated, the space is being illuminated in a lighting state based on the lighting equipment configuration information at the time when the finish button 420 was selected. In other words, the space is being illuminated in the lighting state indicated by the new scene created by the user. Consequently, by capturing an image of the space, the atmosphere of the new scene created by the user may be saved as a captured image. In other words, by looking at the captured image, the user will be able to check the atmosphere of the new scene.

If a captured image is acquired (S130, Yes), the display controller 130 configures the acquired captured image as the scene icon (S132). Note that the image capture unit 140 remains in a state enabling image capture until a captured image is acquired (S130, No).

Also, if the button selected on the image capture confirmation screen 600 is the no button 630 (S126, No), the display controller 130 configures a default image as the scene icon (S134).

Subsequently, the lighting information manager 150 associates together the configuration information for the one or more pieces of lighting equipment, the scene name, and the scene icon, and stores the associated information as a new scene (S136). In other words, if a captured image is acquired by the image capture unit 140, the acquired image is managed as the scene icon, whereas if a captured image is not acquired by the image capture unit 140, a default image is managed as the scene icon.

Finally, the display controller 130 generates a new scene selection screen 700 or 700*a* with the newly created scene in a selected state, and causes the display unit 120 to display the generated new scene selection screen 700 or 700*a* (S138). Consequently, if a captured image is acquired, a new scene selection screen 700 as illustrated in the bottom-middle part of FIG. 11 is displayed by the display unit 120. Also, if a captured image is not acquired, a new scene selection screen 700*a* as illustrated in the bottom-right part of FIG. 11 is displayed by the display unit 120.

Note that after the new scene selection screen 700 or 700*a* is displayed, the process of detecting the press of the create button 330 (S104) and subsequent processing is repeated.

As above, according to a control method of a mobile device 100 in accordance with the present embodiment, when creating a new scene, after finishing the configuration of one or more pieces of lighting equipment, an image of the space illuminated by the one or more pieces of lighting equipment on the basis of that configuration is captured, and the image acquired by image capture is configured as the scene icon of the new scene. In other words, an image illustrating the atmosphere of the new scene is configured as the scene icon.

Subsequently, on the scene selection screen, the image illustrating the atmosphere of the new scene is displayed as the scene icon, and thus the user is able to easily check the atmosphere of the scene simply by looking at the scene icon. In other words, since the scene icon is an image capturing the actual scene, the user is easily able to visually check the atmosphere of the scene.

(Embodiment 2)

Next, a control method of a mobile device 100 according to Embodiment 2 will be described. Specifically, a scene editing method will be described. In other words, in Embodiment 2, a method of configuring a new scene by editing an existing scene will be described. For example, in Embodiment 2, the case in which the edit button 340 on the scene selection screen 300 illustrated in FIG. 3 is selected will be described.

Note that since the configuration of the lighting system 10, the mobile device 100, and the one or more pieces of lighting equipment (the first lighting equipment 200 and the second lighting equipment 201) according to Embodiment 2 is similar to FIG. 1, description may be reduced or omitted in some cases.

First, an edit screen generated by the display controller 130 will be described using FIG. 12. FIG. 12 is a diagram illustrating a scene edit screen 800 according to Embodiment 2.

The scene edit screen 800 is an example of a scene configuration screen, and is a screen for configuring a new scene by editing an existing scene. The scene edit screen 800 is displayed when the edit button 340 on the scene selection screen 300 illustrated in FIG. 3 is selected while one of the scene icons 310 is in a selected state.

As illustrated in FIG. 12, the scene edit screen 800 includes a configuration screen 810, a finish button 420, a delete button 830, and a scene name 840.

The configuration screen 810 is a screen for configuring a new scene indicating a new lighting state by the one or more pieces of lighting equipment by editing the scene corresponding to the selected scene. Specifically, the configuration screen 810 is a screen for configuring a new scene by editing an existing scene. As illustrated in FIG. 12, the configuration screen 810 includes a brightness slider 811*a*, a color tone slider 811*b*, and a lighting equipment name 412.

Compared to the brightness slider 411*a* and the color tone slider 411*b* illustrated in FIG. 5, the brightness slider 811*a* and the color tone slider 811*b* have different initial positions when the scene edit screen 800 is displayed. In other respects, the brightness slider 811*a* and the color tone slider 811*b* are the same as the brightness slider 411*a* and the color tone slider 411*b*, respectively.

The initial positions of the brightness slider 811*a* and the color tone slider 811*b* are decided on the basis of the configuration information corresponding to the selected scene. In other words, the lighting state configured on the configuration screen 810 before operations by the user is the lighting state indicated by the scene corresponding to the selected scene icon.

For example, if the "dining" scene is selected as illustrated in FIG. 12, the initial positions of the brightness slider 811*a* and the color tone slider 811*b* are decided on the basis of the lighting equipment configuration information corresponding to the "dining" scene using the scene information illustrated in FIG. 2. Specifically, for the "living room ceiling light", since the initial value of the brightness ratio is "30" and the initial value of the color temperature is "3500K", the brightness slider 811*a* and the color tone slider 811*b* are respectively displayed at positions corresponding to "30" and "3500K" as initial positions.

The delete button 830 is a button for deleting the selected scene. The delete button 830 is an example of a GUI component, and may be a push-button, for example. When the user selects the delete button 830, the scene name, scene icon, and configuration information corresponding to the selected scene are deleted from the scene information.

The scene name 840 is information indicating the scene being edited. For example, the scene name 840 corresponds to the scene name 320 corresponding to the scene icon 310 selected on the scene selection screen 300 illustrated in FIG. 3. As a result of the scene name 840 being displayed, the user is able to check which scene is the scene currently being edited.

Figure 13B:
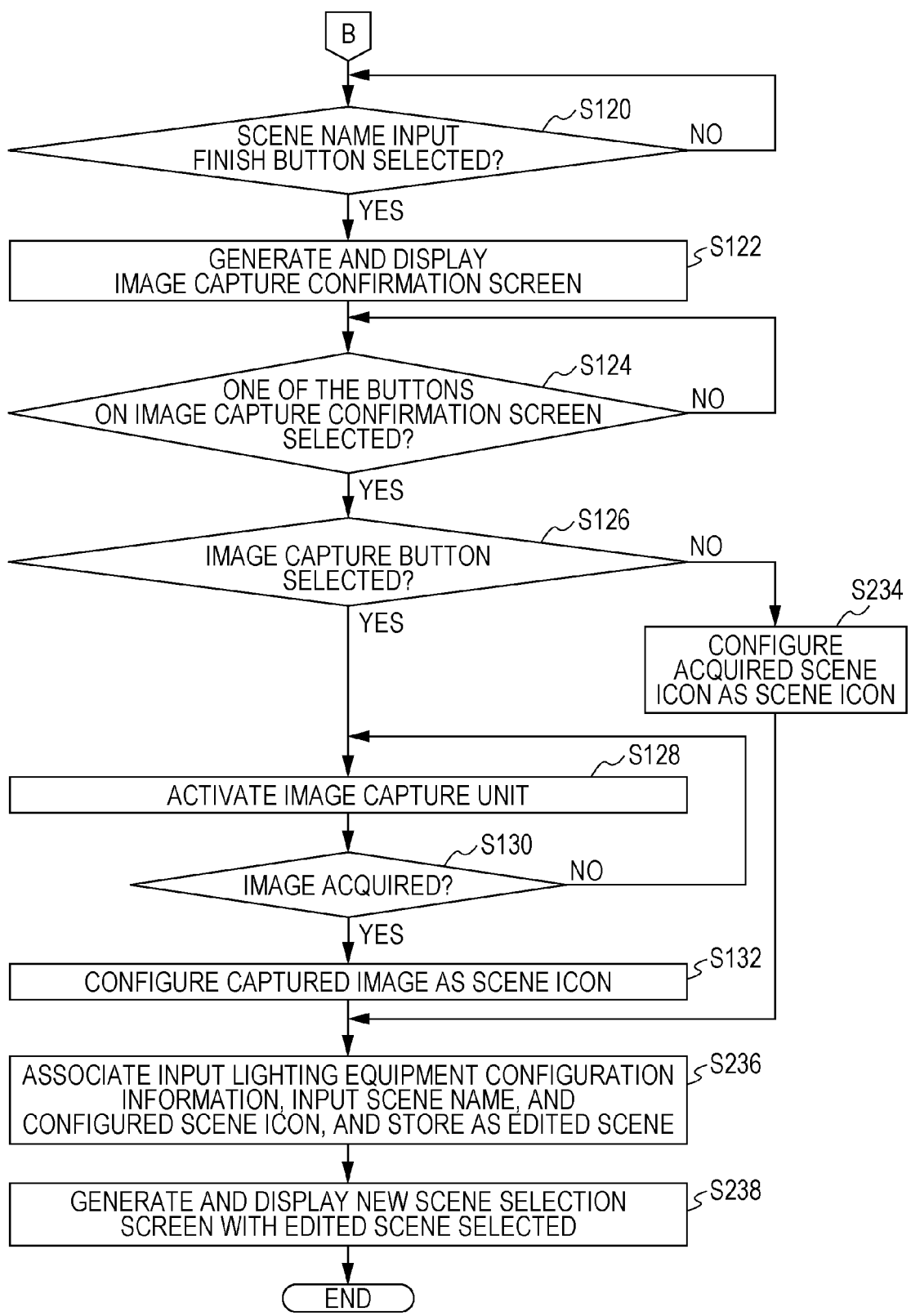
FIG. 13B is a flowchart illustrating the remaining part of an example of a scene editing method according to Embodiment 2.

Next, a scene editing method according to Embodiment 2 will be described using FIGS. 13A, 13B, and 14. FIGS. 13A and 13B are flowcharts illustrating an example of a scene editing method according to Embodiment 2. FIG. 14 is a diagram illustrating an example of screen transitions displayed in the scene editing method according to Embodiment 2. Note that in FIGS. 13A and 13B, the same processes as the scene creation method according to Embodiment 1 are labeled with the same signs, and the description thereof may be reduced or omitted in some cases.

First, the display controller 130 acquires scene information (S100). Subsequently, the display controller 130 generates the scene selection screen 300 on the basis of the acquired scene information, and causes the display unit 120 to display the generated scene selection screen 300 (S102). Consequently, a scene selection screen 300 as illustrated in the top-left part of FIG. 14 is displayed by the display unit 120. The details of the scene selection screen 300 have been described using FIG. 3.

Next, the display controller 130 stands by until a scene icon 310 is selected (S203, No). If one of the one or more scene icons 310 is selected (S203, Yes), the lighting controller 160 generates a control signal on the basis of the configuration information for the one or more pieces of lighting equipment corresponding to the selected scene, and transmits the generated control signal to the one or more pieces of lighting equipment (S204). In other words, the lighting controller 160 generates a control signal for illuminating the space in the lighting state indicated by the scene corresponding to the selected scene icon 310. Subsequently, the lighting controller 160 transmits the generated control signal to the one or more pieces of lighting equipment via the communication unit 170 and the network. As a result, the space is illuminated in the lighting state indicated by the selected scene.

Next, if the scene edit button (edit button 340) is selected (S205, Yes), the display controller 130 acquires operable lighting information (S106). Specifically, when the input unit 110 detects the press of the edit button 340, the display controller 130 reads and acquires the operable lighting information being stored in the lighting information manager 150.

Next, the display controller 130 acquires the lighting equipment configuration information, the scene name, and the scene icon corresponding to the selected scene (S207). Specifically, the display controller 130 reads out and acquires from the lighting information manager 150 the lighting equipment configuration information, the scene name, and the scene icon corresponding to the selected scene.

Next, the display controller 130 generates the scene edit screen 800 on the basis of the acquired operable lighting information, and causes the display unit 120 to display the generated scene edit screen 800 (S208). Consequently, a scene edit screen 800 as illustrated in the top-middle part of FIG. 14 is displayed by the display unit 120. The details of the scene edit screen 800 have been described using FIG. 12.

At this point, the display controller 130 decides the initial position of each slider included on the scene edit screen 800 on the basis of the lighting equipment configuration information corresponding to the selected scene. In other words, as illustrated in the top-middle part of FIG. 14, when the scene edit screen 800 is displayed, sliders are displayed at initial positions decided on the basis of the lighting equipment configuration information corresponding to the "dining" scene.

Note that if the scene edit button (edit button 340) is not selected (S205, No), the display controller 130 stands by until the edit button 340 is selected. At this point, the display controller 130 additionally displays the predetermined frame 360 so as to enclose another selected scene icon. Also, if another scene icon 310 is selected, the lighting controller 160 generates a control signal for illuminating the space in the lighting state indicated by the scene corresponding to the selected scene icon 310. Subsequently, the lighting controller 160 transmits the generated control signal to the one or more pieces of lighting equipment via the communication unit 170 and the network. Consequently, the space may be illuminated in the lighting state indicated by the selected scene.

Next, the display controller 130 and the lighting controller 160 acquire lighting equipment configuration information input by the user (S210). The scene edit screen 800 is displayed as illustrated in the top-middle part of FIG. 14, thereby enabling the user to set configured values of the brightness function or the color tone function for each of the one or more pieces of lighting equipment. The display controller 130 and the lighting controller 160 acquire configured values indicated by the brightness slider 811*a* or the color tone slider 811*b* operated by the user via the input unit 110, for example.

Subsequently, the display controller 130 generates the scene edit screen 800 according to the configured values acquired via the input unit 110, and causes the display unit 120 to display the generated scene edit screen 800. In other words, the display controller 130 continually generates and causes the display unit 120 to display the scene edit screen 800 in synchronization with operations by the user. Specifically, when the user operates a slider, the display of the slider on the scene edit screen 800 is changed according to the user operation. In this way, a modified scene edit screen 800 as illustrated in the top-right part of FIG. 14 is displayed by the display unit 120.

In addition, the lighting controller 160 generates a control signal for controlling the one or more pieces of lighting equipment on the basis of the configuration information indicating the lighting state configured by user operations on the configuration screen (S112). Subsequently, the lighting controller 160 transmits the generated control signal to the one or more pieces of lighting equipment via the communication unit 170 and the network. Consequently, the lighting state produced by the one or more pieces of lighting equipment continually varies in synchronization with user operations.

The acquisition of configuration information from user operations (S210) and the control of lighting equipment (S112) are repeated until the scene edit finish button (finish button 420) is selected (S214, No).

In this way, the lighting state of the one or more pieces of lighting equipment is modified in synchronization with user operations on the configuration screen 810. Consequently, the user is able to configure a desired scene by operating the mobile device 100 while checking the actual atmosphere of the lighting state.

If the scene edit finish button (finish button 420) is selected (S214, Yes), the display controller 130 generates the scene name input screen 500, and causes the display unit 120 to display the generated scene name input screen 500 (S216). Specifically, if the input unit 110 detects the press of the finish button 420, the display controller 130 generates the display unit 500. Consequently, a scene name input screen 500 as illustrated in the middle-left part of FIG. 14 is displayed by the display unit 120. The details of the scene name input screen 500 have been described using FIG. 6.

At this point, when the scene name input screen 500 is displayed, the scene name corresponding to the selected scene icon 310 is displayed in the text box 520. Specifically, "dining" is displayed in the text box 520, as illustrated in the middle-left part of FIG. 14. The user is able to use the displayed scene name as-is. Alternatively, the user may delete the scene name being displayed, and then input a desired scene name into the text box 520.

The input unit 110 acquires text input into the text box 520. Subsequently, the display control unit 130 displays the text acquired by the input unit 110 in the text box 520 (S118). Consequently, a scene name input screen 500 including a text box 520 displaying the text input by the user as illustrated in the center part of FIG. 14 is displayed by the display unit 120. Note that FIG. 14 illustrates the case of changing the scene name from "dining" to "dinner".

Thereafter, the processes from the process of detecting the OK button 530 on the scene name input screen 500 (S120) to the process of configuring a captured image as a scene icon (S132) are the same as the scene creation method illustrated in FIG. 10B.

Specifically, if the OK button 530 is selected, the image capture confirmation screen 600 is displayed, as illustrated in the middle-right part of FIG. 14. Additionally, if the yes button 620 on the image capture confirmation screen 600 is selected, the image capture unit 140 is activated, and an image acquired by the image sensor of the image capture unit 140 (a live-view image) is displayed by the display unit 120, as illustrated in the bottom-left part of FIG. 14. As a result of the user pressing the shutter button, the image capture unit 140 acquires a captured image.

On the other hand, if the button selected on the image capture confirmation screen 600 is the no button 630 (S126, No), the display controller 130 simply configures the scene icon corresponding to the selected scene, or in other words the scene being edited, as the scene icon of the edited scene (S234). Note that at this point, the display controller 130 may also configure a default image as the scene icon.

Subsequently, the lighting information manager 150 associates together the configuration information for the one or more pieces of lighting equipment, the scene name, and the scene icon, and stores the associated information in memory as an edited scene (S236). In other words, if a captured image is acquired by the image capture unit 140, the acquired image is managed as the scene icon, whereas if a captured image is not acquired by the image capture unit 140, the pre-editing scene icon or a default image is managed as the scene icon.

Finally, the display controller 130 generates a new scene selection screen 700b with the edited scene, or in other words the new scene, in a selected state, and causes the display unit 120 to display the generated new scene selection screen 700b (S238). In this way, the display controller 130 causes the display unit 120 to display a new scene selection screen 700b that includes the scene icon of the new scene instead of the scene icon selected from among the one or more scene icons 310 (the scene icon that was edited). Consequently, a new scene selection screen 700b as illustrated in the bottom-middle part of FIG. 14 is displayed by the display unit 120.

Note that after the new scene selection screen is displayed, the process of detecting the press of a scene icon (S203) and subsequent processing is repeated.

As above, according to a control method of a mobile device 100 in accordance with the present embodiment, when configuring a new scene by editing an existing scene, after finishing the configuration of one or more pieces of lighting equipment, an image of the space illuminated by the one or more pieces of lighting equipment on the basis of that configuration is captured, and the image acquired by image capture is configured as the scene icon of the new scene. In other words, an image illustrating the atmosphere of the new scene is configured as the scene icon.

Subsequently, on the scene selection screen, the image illustrating the atmosphere of the new scene is displayed as the scene icon, and thus the user is able to easily check the atmosphere of the scene simply by looking at the scene icon. In other words, since the scene icon is an image capturing the actual scene, the user is easily able to visually check the atmosphere of the scene.

Note that the present embodiment describes an example of configuring a new scene by editing an existing scene. At this point, the existing scene is overwritten by the new scene, but the new scene may also be saved separately from the existing scene. In other words, both the existing scene and the new scene may be included in the scene information. Stated differently, the display controller 130 may also cause the display unit 120 to display a new scene selection screen that includes the one or more scene icons 310 in addition to the scene icon of the new scene.

Figure 15:
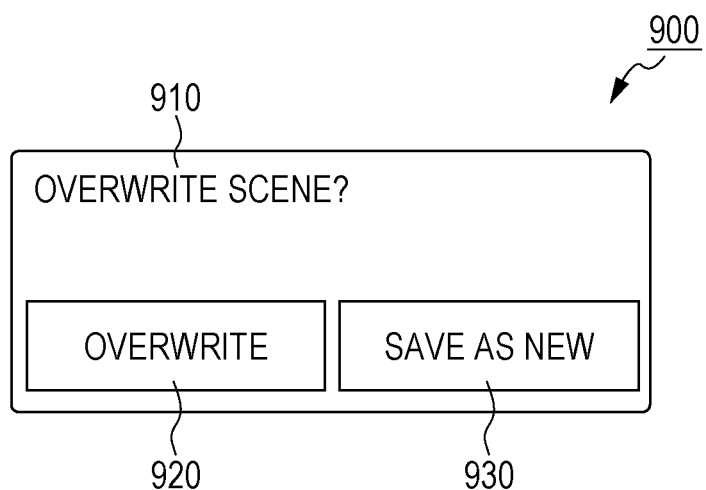
FIG. 15 is a diagram illustrating an example of a save confirmation screen according to an exemplary modification of Embodiment 2.

For example, the display controller 130 generates the save confirmation screen 900 illustrated in FIG. 15, and causes the display unit 120 to display the generated save confirmation screen 900. Herein, FIG. 15 is a diagram illustrating an example of the save confirmation screen 900 according to an exemplary modification of Embodiment 2.

The save confirmation screen 900 is a screen enabling the user to select the method for saving the new scene. Specifically, the save confirmation screen 900 is a screen enabling the user to confirm whether or not save the new scene over the existing scene. As illustrated in FIG. 15, the save confirmation screen 900 includes a comment 910, a yes button 920, and a no button 930.

The comment 910 is text for presenting the operation to be performed by the user. Specifically, the comment 910 is text prompting the user to confirm whether or not to save the new scene over the existing scene (the scene that was edited). For example, as illustrated in FIG. 15, the comment 910 "Overwrite scene?" is displayed. Note that, instead of the comment 910, audio may be used to make the user confirm saving.

The yes button 920 is an example of a GUI component, and may be a push-button, for example. The yes button 920 is a button for saving the new scene over the existing scene, and is a button indicating agreement with the comment 910.

The no button 930 is an example of a GUI component, and may be a push-button, for example. The no button 930 is a button for saving a new copy of the new scene, and is a button indicating disagreement with the comment 910.

Figure 16:
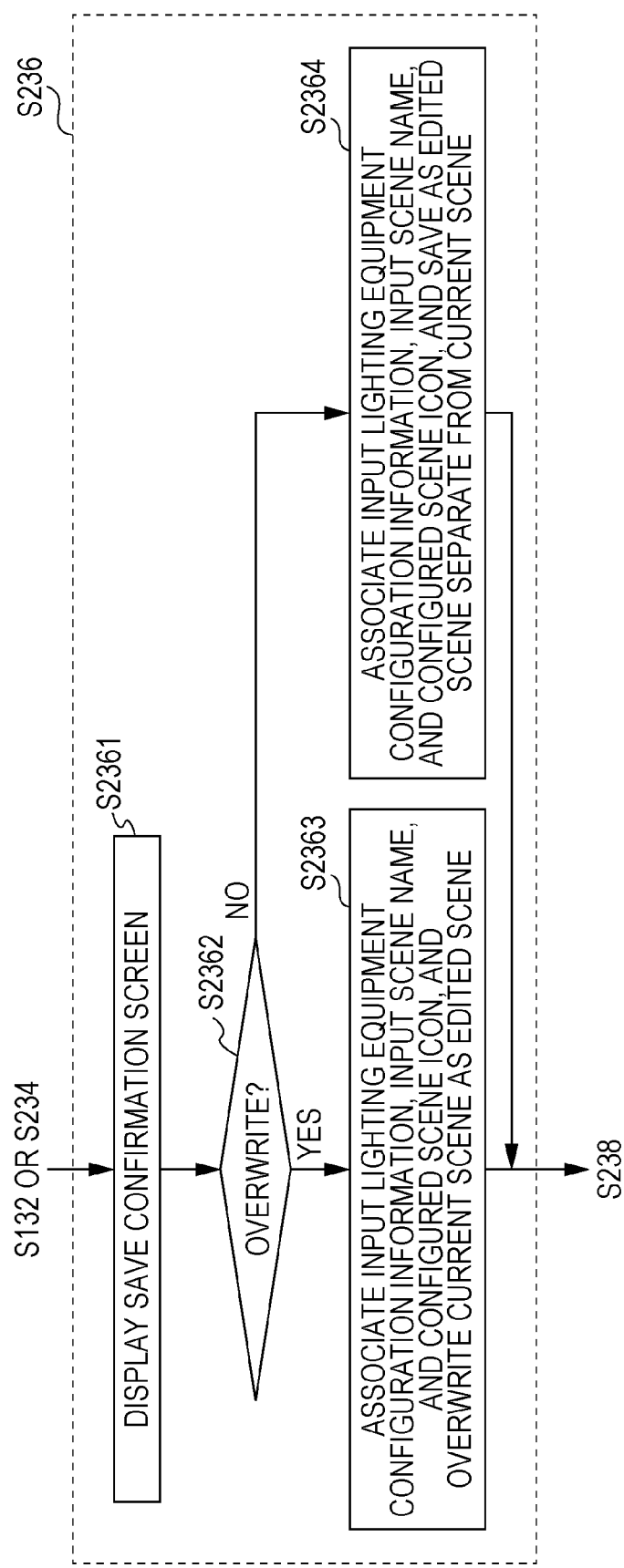
FIG. 16 is a flowchart illustrating an example of a new scene saving process according to an exemplary modification of Embodiment 2.

The process of displaying the save confirmation screen 900 illustrated in FIG. 15 will now be described using FIG. 16. FIG. 16 is a flowchart illustrating an example of a new scene saving process according to an exemplary modification of Embodiment 2. Specifically, FIG. 16 illustrates the details of the saving process (S236) illustrated in FIG. 13B.

As illustrated in FIG. 16, after a captured image is configured as the scene icon (S132), the display controller 130 generates and causes the display unit 120 to display the save confirmation screen 900 (S2361).

If overwriting is selected (S2362, Yes), the new scene is saved over the scene that was edited, and is saved as the edited scene (S2363). Specifically, if the input unit 110 detects the press of the yes button 920, the lighting information manager 150 stores the configuration information for the one or more pieces of lighting equipment, the scene name, and the scene icon of the new scene in place of the configuration information for the one or more pieces of lighting equipment, the scene name, and the scene icon of the scene that was edited. Consequently, the number of scenes included in the scene information before and after the editing of the scene remains the same.

If saving a new copy is selected (S2362, No), the new scene is saved as an edited scene separately from the scene that was edited (S2364). Specifically, if the input unit 110 detects the press of the no button 930, the lighting information manager 150 newly stores the configuration information for the one or more pieces of lighting equipment, the scene name, and the scene icon of the new scene. Consequently, the number of scenes included in the scene information before and after the editing of the scene increases by one.

As above, if a new scene is configured by editing an existing scene, the lighting system 10 may cause the user to select whether or not to save the new scene over the scene that was edited. In other words, the lighting system 10 may cause the user to select whether or not to keep the existing scene. Consequently, the lighting system 10 is able to save a scene that was slightly edited from an existing scene separately from the existing scene, for example.

(Other Embodiments)

The foregoing thus describes a control method of a mobile device according to one or more aspects, but the present disclosure is not limited to these exemplary embodiments. Embodiments obtained by applying various modifications that may occur to persons skilled in the art as well as embodiments constructed by combining the structural elements in different embodiments may also be included within the scope of the one or more aspects, insofar as such embodiments do not depart from the spirit of the present disclosure.

For example, the above respective embodiments describe an example in which the display unit 120 is made to display the image capture confirmation screen 600, and if the yes button 620 is selected, the display controller 130 activates the image capture unit 140. However, the configuration is not limited thereto. For example, the display controller 130 may also activate the image capture unit 140 without causing the display unit 120 to display the image capture confirmation screen 600.

In other words, if the configuration finish button on the scene configuration screen is selected, the display controller 130 may activate the image capture unit 140. Specifically, the display controller 130 may activate the image capture unit 140 when the finish button 420 on the scene creation screen 400 or the scene edit screen 800 is selected.

For example, in the example illustrated in FIGS. 10A and 10B, the image capture unit 140 is activated when the finish button 420 is selected, and in addition, the OK button 530 on the scene name input screen 500 is selected. Specifically, if the input unit 110 detects the press of the OK button 530, the display controller 130 immediately activates the image capture unit 140. In other words, if the input unit 110 detects the press of the OK button 530, the display controller 130 activates the image capture unit 140 without causing another screen to be displayed. Herein, another screen is a screen including a GUI component that accepts input from the user, for example.

Note that the display controller 130 may also immediately activate the image capture unit 140 when the finish button 420 on the scene creation screen 400 or the scene edit screen 800 is selected. Specifically, if the input unit 110 detects the press of the finish button 420, the display controller 130 may activate the image capture unit 140 without causing another screen such as the scene name input screen 500 to be displayed.

As a result, the image capture unit 140 is always executed when configuring a new scene, and the user is able to capture a scene icon. Consequently, a scene icon displayed on the scene selection screen is guaranteed to be a captured image, and the user is able to easily check the atmosphere of the scene.

Also, the above respective embodiments describe an example in which, if a captured image is not acquired, a predetermined default image is configured as the scene icon. However, the configuration is not limited thereto. For example, if a captured image is not acquired, one default image from among multiple default images may be selected, and the selected default image may be configured as the scene icon.

Figure 17:
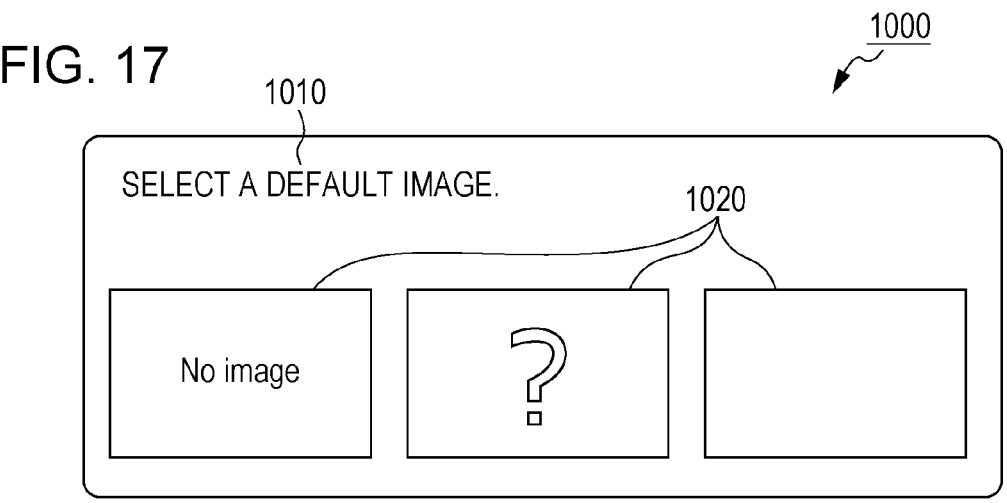
FIG. 17 is a diagram illustrating an example of a default image selection screen according to an exemplary modification of an embodiment.

For example, the display controller 130 generates the default image selection screen 1000 illustrated in FIG. 17, and causes the display unit 120 to display the generated default image selection screen 1000. Herein, FIG. 17 is a diagram illustrating an example of the default image selection screen 1000 according to an exemplary modification of an embodiment.

The default image selection screen 1000 is a screen enabling the user to select one default image from among multiple predetermined default images. As illustrated in FIG. 17, the default image selection screen 1000 includes a comment 1010 and multiple default images 1020.

The comment 1010 is text for presenting the operation to be performed by the user. Specifically, the comment 1010 is text for prompting the user to select a default image. For example, as illustrated in FIG. 17, the comment 1010 "Select a default image." is displayed. Note that, instead of the comment 1010, audio may prompt the user to select a default image.

The multiple default images 1020 are selectable by the user. In other words, the multiple default images 1020 are selected as a result of the user's finger or the like touching the touchscreen.

Figure 18:
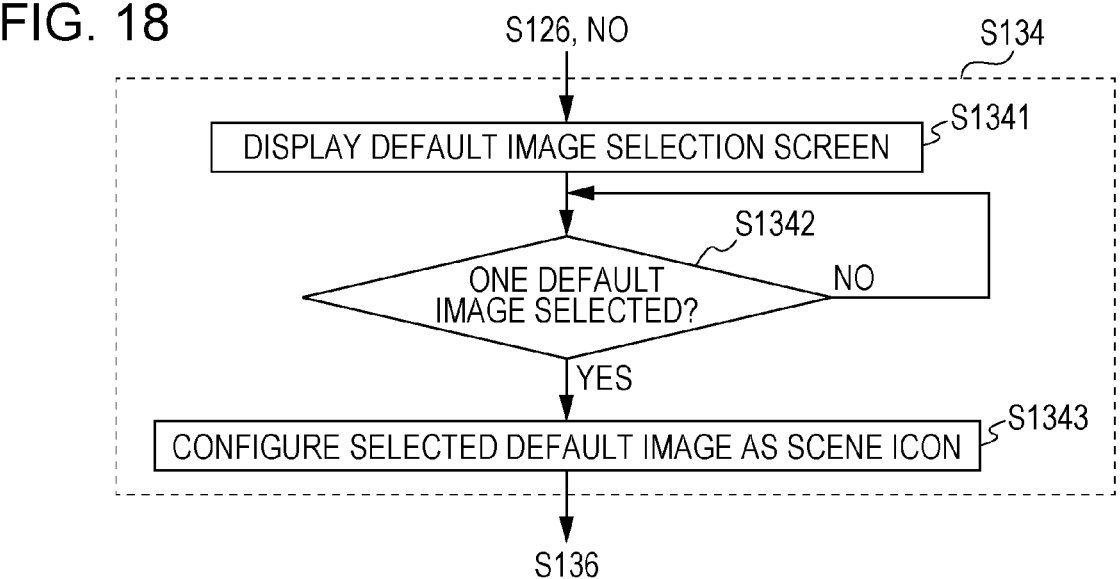
FIG. 18 is a flowchart illustrating an example of a default image selection screen according to an exemplary modification of an embodiment.

The process of displaying the default image selection screen 1000 illustrated in FIG. 17 will now be described using FIG. 18. FIG. 18 is a flowchart illustrating an example of a default image selection screen according to an exemplary modification of an embodiment. Specifically, FIG. 18 illustrates the details of the default image selection process (S134) illustrated in FIG. 10B.

As illustrated in FIG. 18, if the no button 630 on the image capture confirmation screen 600 is selected (S126, No), the display controller 130 generates and causes the display unit 120 to display the default image selection screen 1000 (S1341). As a result, the user is able to select one arbitrary default image from among the multiple default images 1020.

If one default image is selected (S1342, Yes), the display controller 130 configures the selected default image as the scene icon (S1343). Specifically, when the input unit 110 detects the default image selected by the user, the display controller 130 configures the selected default image as the scene icon of the new scene. Note that if a default image is not selected (S1342, No), the process stands by until a default image is selected.

As a result, the user may be informed that a captured image was not acquired, and may be prompted again to acquire a captured image.

Also, the above respective embodiments describe an example in which, if one captured image is acquired, the captured image is configured as the scene icon. However, the configuration is not limited thereto. For example, multiple images may also be captured.

Figure 19:
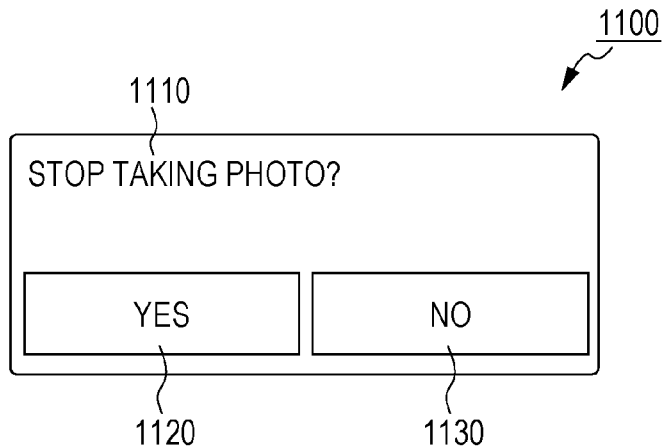
FIG. 19 is a diagram illustrating an example of an image capture end confirmation screen according to an exemplary modification of an embodiment.

For example, in FIG. 10B, after the image capture unit 140 is activated (S128), the display controller 130 generates the image capture end confirmation screen 1100 illustrated in FIG. 19, and causes the display unit 120 to display the generated image capture end confirmation screen 1100. For example, the image capture end confirmation screen 1100 is displayed every time image capture is conducted, or in other words, every time one captured image is acquired.

Herein, FIG. 19 is a diagram illustrating an example of the image capture end confirmation screen 1100 according to an exemplary modification of an embodiment. The image capture end confirmation screen 1100 is a screen enabling the user to confirm whether or not to end image capture. In other words, the image capture end confirmation screen 1100 is a screen for the user to confirm whether or not to end image capture by the image capture unit 140. As illustrated in FIG. 19, the image capture end confirmation screen 1100 includes a comment 1110, a yes button 1120, and a no button 1130.

The comment 1110 is text for presenting the operation to be performed by the user. Specifically, the comment 1110 is text for having the user confirm whether or not to end image capture by the image capture unit 140. For example, as illustrated in FIG. 19, the comment 1110 "Stop taking photo?" is displayed. Note that, instead of the comment 1110, audio may be used to make the user confirm image capture.

The yes button 1120 is an example of a GUI component, and may be a push-button, for example. The yes button 1120 is an example of a button for ending image capture by the image capture unit 140, and is a button indicating agreement with the comment 1110.

When the yes button 1120 is selected, image capture by the image capture unit 140 is ended. Specifically, when the input unit 110 detects the press of the yes button 1120, the image capture unit 140 is stopped.

The no button 1130 is an example of a GUI component, and may be a push-button, for example. The no button 1130 is an example of a button for continuing image capture by the image capture unit 140, and is a button indicating disagreement with the comment 1110.

When the no button 1130 is selected, image capture by the image capture unit 140 is continued. Specifically, when the input unit 110 detects the press of the no button 1130, the image capture unit 140 remains active, or in other words, is kept in the state enabling image capture.

As a result, since image capture is continue, the image capture unit 140 is able to acquire multiple images.

At this point, the display controller 130 may also configure the multiple images acquired by the image capture unit 140 as scene icons of the new scene. In other words, the lighting information manager 150 manages the multiple images acquired by the image capture unit 140 as scene icons of the new scene.

Hereinafter, an example of displaying multiple images as new scene icons will be described using FIGS. 20 to 22. Note that FIGS. 20 to 22 are diagrams illustrating examples of a scene selection screen according to an exemplary modification of an embodiment.

Figure 20:
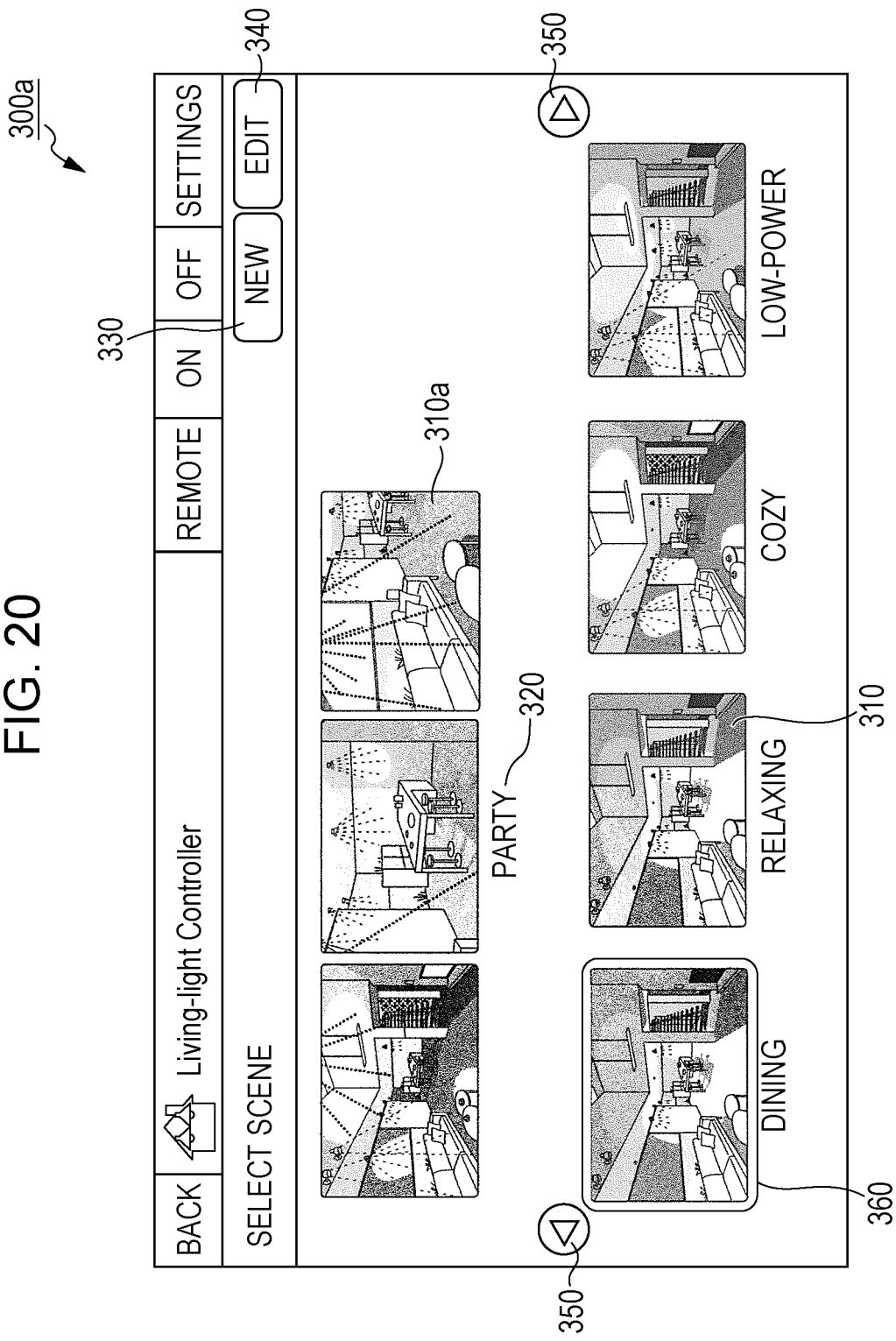
FIG. 20 is a diagram illustrating an example of a scene selection screen according to an exemplary modification of an embodiment.

For example, in the scene selection screen 300a illustrated in FIG. 20, multiple images are displayed side-by-side as scene icons 310a. Specifically, the display controller 130 generates and causes the display unit 120 to display a scene selection screen 300a that includes multiple images arranged side-by-side as scene icons 310a. At this point, the multiple images are treated as a single image arranged in two dimensions, for example.

Figure 21:
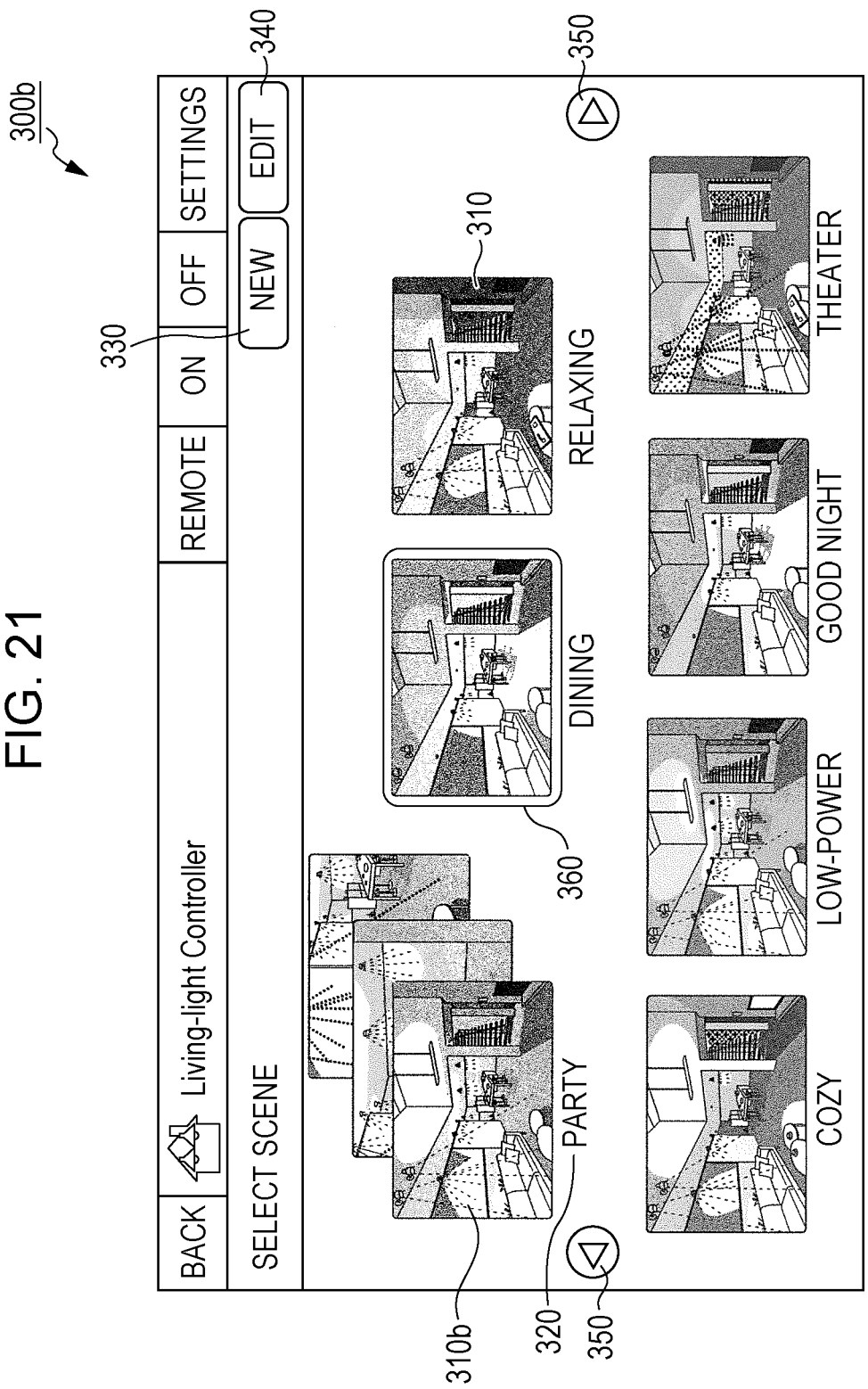
FIG. 21 is a diagram illustrating another example of a scene selection screen according to an exemplary modification of an embodiment.

As another example, on the scene selection screen 300b illustrated in FIG. 21, multiple images that at least partially overlap are displayed as scene icons 310b. Specifically, the display controller 130 generates and causes the display unit 120 to display a scene selection screen 300b that includes multiple images that at least partially overlap as scene icons 310b. At this point, if the input unit 110 detects a scroll operation on the multiple images, the display controller 130 may switch the image displayed farthest in front for another image from among the multiple images.

Figure 22:
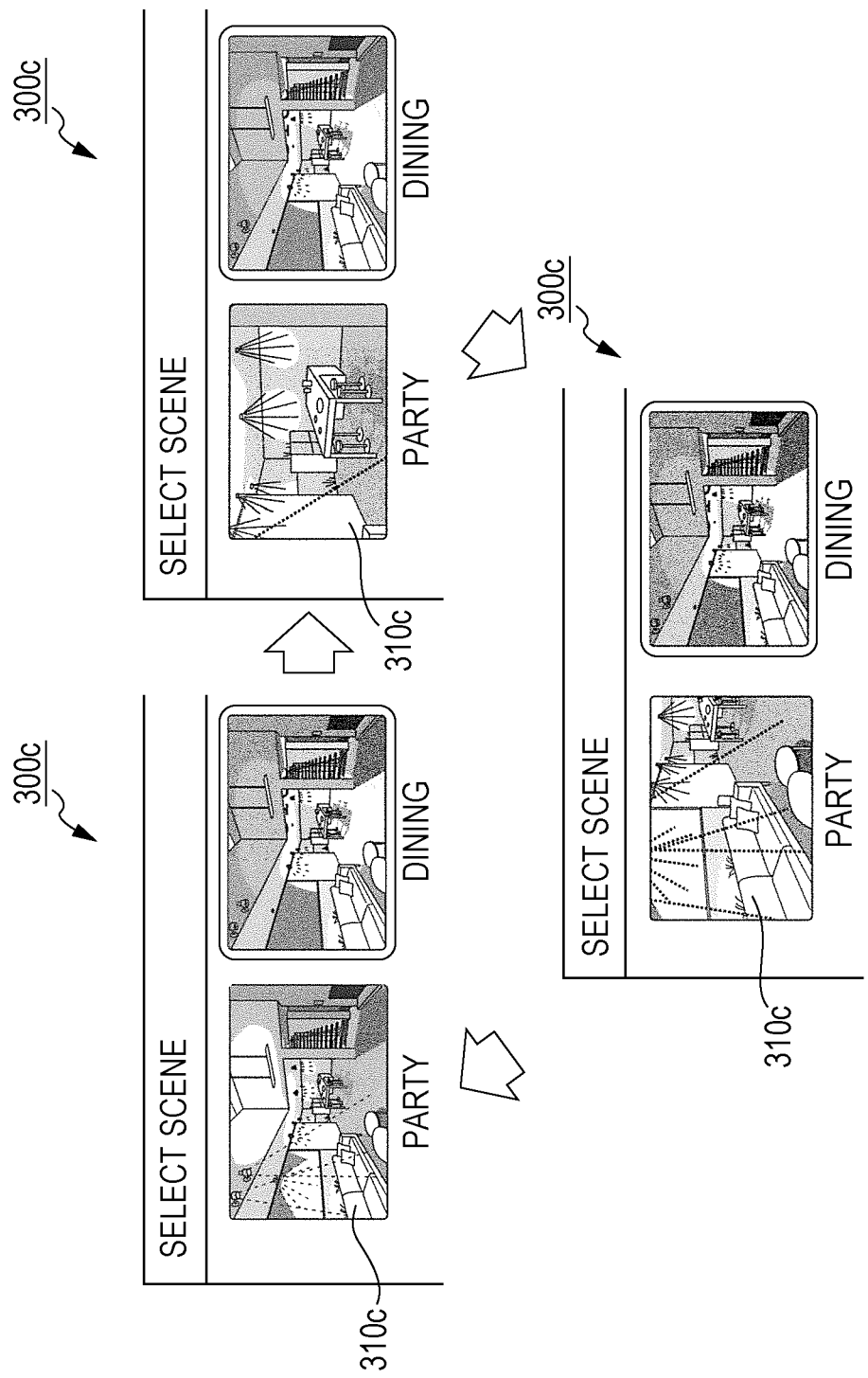
FIG. 22 is a diagram illustrating another example of a scene selection screen according to an exemplary modification of an embodiment.

As another example, on the scene selection screen 300c illustrated in FIG. 22, multiple images that completely overlap are displayed as scene icons 310c. At this point, when a designated period of time elapses, the display controller 130 switches the image displayed farthest in front for another image from among the multiple images. In other words, the display controller 130 displays the multiple images in a slideshow. For example, every time a fixed period of time elapses, the displayed image changes in the order from the top-left, top-right, bottom, and top-left parts of FIG. 22.

As a result, since multiple images are configured as scene icons, the user is able to more easily check the atmosphere of the scene from the multiple images. For example, when acquiring captured images, the space may be captured at multiple angles from multiple positions, thereby enabling the user to capture the atmosphere of the scene in more detail in the captured images.

An example is illustrated in which, if multiple captured images are acquired, the multiple acquired images are collectively configured as scene icons. However, the configuration is not limited thereto. For example, the user may select one captured image from the multiple captured images, and the selected image may be configured as the scene icon.

Specifically, the display controller 130 may generate a screen for selecting one captured image as the scene icon from among multiple captured images, and cause the display unit 120 to display the generated screen. For example, on the default image selection screen 1000 illustrated in FIG. 17, the display controller 130 may display the multiple captured images instead of the multiple default images.

Figure 23:
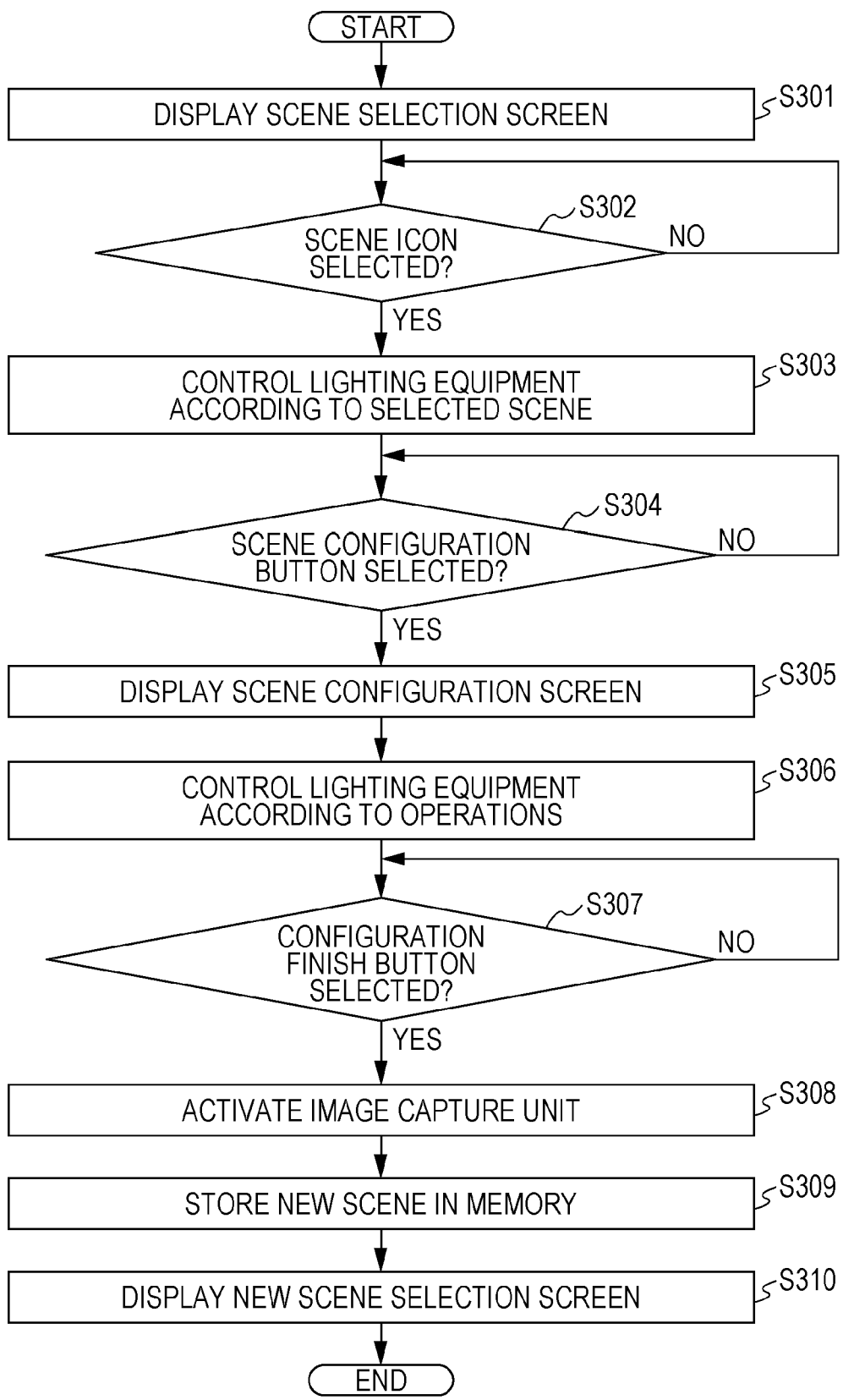
FIG. 23 is a flowchart illustrating an example of a scene configuration method according to an exemplary modification of an embodiment.

Also, although the above respective embodiments describe a detailed configuration for a control method of the mobile device 100, screens such as the scene name input screen 500 or the image capture confirmation screen 600 may also not be displayed, for example. Specifically, the mobile device 100 may be controlled according to the flowchart illustrated in FIG. 23. Herein, FIG. 23 is a flowchart illustrating an example of a scene configuration method according to an exemplary modification of an embodiment.

First, the display controller 130 causes the display unit 120 to display a scene selection screen 300 including one or more scene icons 310 corresponding to one or more scenes indicating one or more lighting states by one or more pieces of lighting equipment, and a scene configuration button (S301). The scene configuration button may be the create button 330 or the edit button 340, for example.

Next, if one scene icon is selected from among the one or more scene icons (S302, Yes), the lighting controller 160 transmits to the one or more pieces of lighting equipment a control signal for controlling the one or more pieces of lighting equipment so that the space is illuminated in the lighting state indicated by the scene corresponding to the selected icon (S303).

Next, if the scene configuration button is selected (S304, Yes), the lighting controller 160 causes the display unit 120 to display a scene configuration screen that includes a configuration screen for configuring a new scene indicating a new lighting state by the one or more pieces of lighting equipment, and a configuration finish button (S305). Herein, the scene configuration screen may be the scene creation screen 400 or the scene edit screen 800, for example.

Note that if a scene icon is not selected (S302, No), or if the scene configuration button is not selected (S304, No), the display controller 130 stands by until one of the buttons is selected.

Next, the display controller 130 and the lighting controller 160 transmit to the one or more pieces of lighting equipment a control signal for controlling the one or more pieces of lighting equipment on the basis of the configuration information indicating the lighting state configured by user operations on the configuration screen (S306).

Next, after the configuration finish button is selected (S307, Yes), the display controller 130 activates the image capture unit 140 (S308).

Next, if the configuration information from when the configuration finish button was selected is treated as configuration information for a new scene, and an image is acquired by the image capture unit 140, the display controller 130 causes the relevant image to be stored in the lighting information manager 150 as the scene icon of the new scene (S309).

Finally, the display controller 130 causes the display unit 120 to display a new scene selection screen 700 or 700a including the scene icon of the new scene (S310).

As above, according to a control method of a mobile device 100 in accordance with an exemplary modification of an embodiment, when creating a new scene, after finishing the configuration of one or more pieces of lighting equipment, the user captures an image of the space illuminated by the one or more pieces of lighting equipment on the basis of that configuration, and the image acquired by image capture is configured as the scene icon of the new scene. In other words, an image illustrating the atmosphere of the new scene is configured as the scene icon.

Subsequently, on the scene selection screen, the image illustrating the atmosphere of the new scene is displayed as the scene icon, and thus the user is able to easily check the atmosphere of the scene simply by looking at the scene icon.

In other words, since the scene icon is an image capturing the actual scene, the user is easily able to visually check the atmosphere of the scene.

Also, the above respective embodiments describe an example in which the mobile device 100 is equipped with the display controller 130, the lighting information manager 150, and the lighting controller 160, but the configuration is not limited thereto. For example, a server connected to the mobile device 100 via a network may also be equipped with the display controller 130, the lighting information manager 150, and the lighting controller 160. In other words, the mobile device may also be a device that displays screens and captures images on the basis of instructions transmitted from a server via a network.

Figure 24:
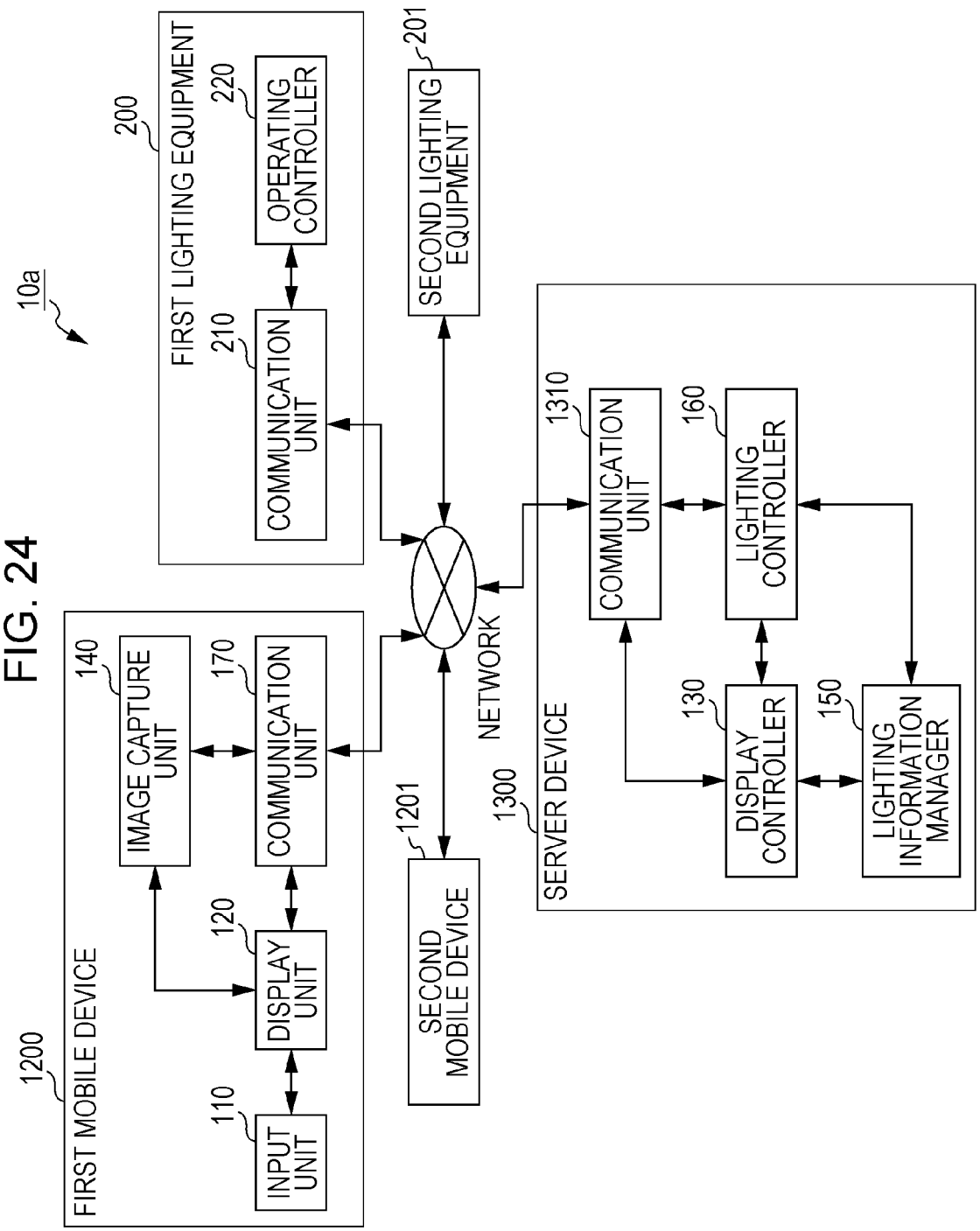
FIG. 24 is a block diagram illustrating an example of a lighting system according to an exemplary modification of an embodiment.

FIG. 24 is a block diagram illustrating a lighting system 10a according to an exemplary modification of an embodiment. As illustrated in FIG. 24, the lighting system 10a is equipped with a first mobile device 1200, a second mobile device 1201, first lighting equipment 200, second lighting equipment 201, and a server device 1300.

The first mobile device 1200 is an example of a device that controls one or more pieces of lighting equipment that illuminate a space. Specifically, the first mobile device 1200 controls the one or more pieces of lighting equipment (in the example illustrated in FIG. 24, the first lighting equipment 200 and the second lighting equipment 201) via the server device 1300.

As illustrated in FIG. 24, the first mobile device 1200 is equipped with an input unit 110, a display unit 120, an image capture unit 140, and a communication unit 170.

Each processing unit conducts a process on the basis of an instruction from the server device 1300. For example, the display unit 120 displays a screen that is generated by the display controller 130 of the server device 1300 and acquired via the communication unit 170. Also, the image capture unit 140 transmits an image acquired by image capture to the server device 1300 via the communication unit 170. Also, the input unit 110 transmits operating input from the user to the server device 1300 via the communication unit 170.

The second mobile device 1201, similarly to the first mobile device 1200, is an example of a device that controls the one or more pieces of lighting equipment that illuminate a space. In other words, the first lighting equipment 200 and the second lighting equipment 201 are controllable from each of the first mobile device 1200 and the second mobile device 1201. Stated differently, the one or more pieces of lighting equipment may be controlled by each of one or more mobile devices. Note that the second mobile device 1201, similarly to the first mobile device 1200, is equipped with an input unit 110, a display unit 120, an image capture unit 140, and a communication unit 170.

The server device 1300 is a server controlling a mobile device that controls the one or more pieces of lighting equipment illuminating the space. Specifically, the server device 1300 controls the first mobile device 1200 and the second mobile device 1201.

As illustrated in FIG. 24, the server device 1300 is equipped with a communication unit 1310, a display controller 130, a lighting information manager 150, and a lighting controller 160.

The communication unit 1310 transmits a control signal generated by the lighting controller 160 to one or more pieces of lighting equipment connected via a network. In addition, the communication unit 1310 transmits to the first mobile device 1200 information indicating a screen generated by the display controller 130 to be displayed by the display unit 120. In addition, the communication unit 1310 receives from the first mobile device 1200 operating input from the user that is acquired via the input unit 110 and the display unit 120. In addition, the communication unit 1310 receives from the first mobile device 1200 an image acquired by the image capture unit 140.

For example, the communication unit 1310 is a communication interface such as a wireless local area network (WLAN) module, a Bluetooth (registered trademark) module, or a near field communication (NFC) module. Note that the communication unit 1310 may also be a wired LAN port or the like.

For example, consider a case in which the first mobile device 1200 creates a first scene and the second mobile device 1201 creates a second scene. Specifically, the first mobile device 1200 and the second mobile device 1201 each communicate with the server device 1300 to thereby create the first scene and the second scene. At this point, the lighting information manager 150 of the server device 1300 manages scene information including the first scene and the second scene.

The display controller 130 generates a scene selection screen on the basis of scene information managed by the lighting information manager 150, and thus the scene icon of the first scene and the scene icon of the second scene are displayed on the scene selection screen. As a result, both the first mobile device 1200 and the second mobile device 1201 are each able to select the first scene and the scene.

As above, by having the server device 1300 control one or more mobile devices and one or more pieces of lighting equipment, user convenience may be increased. For example, even if the user creates a scene using any of the one or more mobile devices, it becomes possible to select a scene from any mobile device.

Note that at this point, the first mobile device 1200 and the second mobile device 1201 may also be equipped with the display controller 130 and the lighting controller 160, while the server device 1300 may be equipped with the lighting information manager 150. In other words, the server device 1300 may collectively manage the scene information and the operable lighting information, while the first mobile device 1200 and the 1201 may generate and transmit control signals to the one or more pieces of lighting equipment.

Also, the respective embodiments illustrate an example in which each button is a push-button, but the configuration is not limited thereto. For example, each button may also be a GUI component such as a radio button, a check box, a drop-down list, or a list box. In the above respective embodiments, each structural element may be configured by dedicated hardware, but may also be realized by executing a software program suited to each structural element. For example, the display unit 120, the image capture unit 140, the communication unit 170, the communication unit 210, and the communication unit 1310 may be configured by dedicated hardware, while all other structural elements may be realized by a software program. Each structural element may be realized as a result of a program execution unit such as a CPU or processor reading out and executing a software program recorded on a recording medium such as a hard disk or semiconductor memory.

Note that the specific embodiments discussed in the foregoing primarily include configurations with the following aspects.

One aspect according to the present disclosure is a control method of a mobile device that controls one or more pieces of lighting equipment that illuminate a space, the mobile device including a display unit and an image capture unit, and the control method of the mobile device causing a computer of the mobile device to execute: displaying on the display unit a scene configuration screen that includes a configuration screen for configuring a new scene indicating a new lighting state by the one or more pieces of lighting equipment, and a configuration finish button; transmitting to the one or more pieces of lighting equipment a control signal for controlling the one or more pieces of lighting equipment on the basis of configuration information indicating a lighting state configured by user operations on the configuration screen; activating the image capture unit after the configuration finish button is selected; storing the configuration information from when the configuration finish button was selected in memory as configuration information for the new scene, and in addition, if an image is acquired by the image capture unit, storing the image in the memory as a scene icon of the new scene; and displaying on the display unit a new scene selection screen that includes the scene icon of the new scene.

As a result, the atmosphere of a scene may be easily checked. Furthermore, as an example, the scene selection screen includes one or more scene icons corresponding to one or more scenes indicating one or more lighting states by the one or more pieces of lighting equipment, and a scene configuration button. The control method of the mobile device includes: displaying the scene selection screen; if one scene icon is selected from among the one or more scene icons, transmitting to the one or more pieces of lighting equipment a control signal for controlling the one or more pieces of lighting equipment so that the space is illuminated in the lighting state indicated by the scene corresponding to the selected scene icon; and if the scene configuration button is selected, displaying on the display unit the scene configuration screen.

As another example, the scene configuration button is a scene creation button, and the control method of the mobile device includes: in the displaying of the scene configuration screen, displaying on the display unit the scene configuration screen if the scene creation button is selected; and in the displaying of the new scene selection screen, displaying on the display unit the new scene selection screen including the one or more scene icons and the scene icon of the new scene.

As a result, one or more existing scene icons as well as the scene icon of a newly added new scene are displayed on the new scene selection screen, and thus the user is able to select the newly added new scene while looking at the displayed scene icons. Since the scene icon is an image acquired by the image capture unit, the user is able to easily check the atmosphere of the scene.

As another example, the scene configuration button is a scene edit button, and the control method of the mobile device includes: in the displaying of the scene configuration screen, displaying on the display unit the scene configuration screen if the scene edit button is selected while one scene icon from among the one or more scene icons is in a selected state; and configuring the new scene by editing the scene corresponding to the selected scene icon.

As a result, the scene corresponding to the selected scene icon is edited, and thus an unwanted scene may be substituted with a desired new scene, for example.

As another example, the control method of the mobile device includes, in the displaying of the new scene selection screen, displaying on the display unit the new scene selection screen including the scene icon of the new scene instead of the selected scene icon from among the one or more scene icons, or in addition to the one or more scene icons.

As a result, an unwanted scene may be deleted, or a new scene may be saved while keeping an existing scene. For example, by deleting an unwanted scene, memory resources may be effectively utilized.

As another example, a lighting state configured on the configuration screen before operations by the user may be a lighting state indicated by a scene corresponding to a selected scene icon.

As a result, since the lighting state configured on the configuration screen before being operated is the lighting state indicated by the scene corresponding to the selected scene icon, a new scene may be configured on the basis of an existing scene, and thus the new scene may be configured easily. For example, this configuration is particularly useful when configuring a scene that is only slightly different from an existing scene.

As another example, the control method of the mobile device additionally includes: displaying on the display unit an activation button for activating the image capture unit when the configuration finish button is selected; and in the activating of the image capture unit, activating the image capture unit when the activation button is selected.

As a result, since an activation button for activating the image capture unit is displayed, the user may be informed of the occasion for image capture.

As another example, the control method of the mobile device may include: in the displaying of the activation button, displaying on the display unit a non-activate button for not activating the image capture unit together with the activate button; and in the storing in the memory, storing in the memory a default image as the scene icon of the new scene if the non-activate button is selected.

As a result, an activate button and a non-activate button are displayed, thereby enabling the user to select whether or not to conduct image capture.

As another example, the control method of the mobile device additionally includes: if the non-activate button is selected, displaying on the display unit a default image selection screen that includes a plurality of default images; and in the storing in the memory, storing in the memory a default image selected from the plurality of default images as the scene icon of the new scene if the non-activate button is selected.

As a result, even if image capture is not conducted, one default image is selected and display from among a plurality of default images, and thus the user may be informed that image capture was not conducted.

As another example, the control method of the mobile device includes, in the displaying of the activation button, displaying on the display unit a comment for instructing the user to confirm whether or not conduct image capture by the image capture unit, together with the activate button and the non-activate button. The activate button is a button indicating agreement with the comment, while the non-activate button is a button indicating disagreement with the comment.

As a result, a comment instructing the user to confirm whether or not to conduct image capture by the image capture unit is displayed, and thus the user is easily able to visually judge whether or not to conduct image capture.

As another example, the control method of the mobile device includes, in the activating of the image capture unit, activating the image capture unit when the configuration finish button is selected.

As a result, since the image capture unit is activated when the configuration finish button is selected, the user is strongly encouraged to acquire an image. For example, the user may be more strongly encouraged to acquire an image by immediately and forcibly activating the image capture unit when the configuration finish button is selected.

As another example, on the new scene selection screen, the scene icon of the new scene may be displayed in a selected state.

As a result, the scene icon of the new scene is displayed in a selected state, and the space is illuminated in the lighting state corresponding to the new scene.

As another example, the control method of the mobile device additionally includes: displaying on the display unit an input screen enabling the user to input a scene name when the configuration finish button is selected; and in the storing in the memory, additionally storing in the memory a scene name input on the input screen as the scene name of the new scene.

As a result, the user may be prompted to input a scene name for the new scene, enabling the user to register a name that is easily recognizable for the user as the scene name.

As another example, the control method of the mobile device includes, in the storing in the memory, if a plurality of images are acquired by the image capture unit, storing in the memory the plurality of images as scene icons of the new scene.

As a result, since images may be captured multiple times, images capturing the space from various angles may be utilized as scene icons, for example. Consequently, the user is able to check the atmosphere of the scene more easily.

As another example, on the new scene selection screen, the plurality of images may be displayed side-by-side as the scene icons.

As a result, since the plurality of images are displayed side-by-side, the user is able to more easily check the atmosphere of the scene.

As another example, on the new scene selection screen, the plurality of images may be displayed at least partially overlapping as the scene icons.

As a result, since the plurality of images are displayed at least partially overlapping, more images may be displayed on a single screen. Consequently, the user is able to view more images, and check the atmosphere of the scene more easily.

As another example, on the new scene selection screen, if a scroll operation on the plurality of images is detected, or if a predetermined period of time elapses, the control method may switch the image displayed farthest in front for another image from among the plurality of images.

As a result, since the image displayed farthest in front is switched, the user is able to respectively view all of the plurality of images, and more easily check the atmosphere of the scene.

Note that these general or specific aspects may also be realized by a system, device, integrated circuit, computer program, or computer-readable recording medium such as a CD-ROM disc, and may also be realized by an arbitrary combination of a system, device, integrated circuit, computer program, and recording medium. Herein, software that realizes a mobile device according to the above respective embodiments is a program like the following.

Namely, such a program is a control program of a mobile device that controls one or more pieces of lighting equipment that illuminate a space, the mobile device including a display unit and an image capture unit, and the control program of the mobile device causing a computer of the mobile device to execute: displaying on the display unit a scene configuration screen that includes a configuration screen for configuring a new scene indicating a new lighting state by the one or more pieces of lighting equipment, and a configuration finish button; transmitting to the one or more pieces of lighting equipment a control signal for controlling the one or more pieces of lighting equipment on the basis of configuration information indicating a lighting state configured by user operations on the configuration screen; activating the image capture unit after the configuration finish button is selected; storing the configuration information from when the configuration finish button was selected in memory as configuration information for the new scene, and in addition, if an image is acquired by the image capture unit, storing the image in the memory as a scene icon of the new scene; and displaying on the display unit a new scene selection screen that includes the scene icon of the new scene.

The present disclosure is usable as a control method of a mobile device that includes a camera function, and is usable in devices such as a smartphone, mobile phone, tablet, and PDA, for example.

What is claimed is:

1. A control method of a mobile device that controls one or more pieces of lighting equipment that illuminate a space, the mobile device including a display unit and an image capture unit, and the control method of the mobile device causing a computer of the mobile device to execute:
    displaying on the display unit a scene configuration screen that includes a configuration screen for configuring a new scene indicating a new lighting state by the one or more pieces of lighting equipment, and a configuration finish button;
    transmitting to the one or more pieces of lighting equipment a control signal for controlling the one or more pieces of lighting equipment on the basis of configuration information indicating a lighting state configured by user operations on the configuration screen;
    activating the image capture unit after the configuration finish button is selected;
    storing the configuration information from when the configuration finish button was selected in memory as configuration information for the new scene, and in addition, if an image is acquired by the image capture unit, storing the image in the memory as a scene icon of the new scene; and
    displaying on the display unit a new scene selection screen that includes the scene icon of the new scene.

2. The method according to claim 1, wherein
the scene selection screen includes one or more scene icons corresponding to one or more scenes indicating one or more lighting states by the one or more pieces of lighting equipment, and a scene configuration button, and
the control method of a mobile device includes:
displaying the scene selection screen;
if one scene icon is selected from among the one or more scene icons, transmitting to the one or more pieces of lighting equipment a control signal for controlling the one or more pieces of lighting equipment so that the space is illuminated in the lighting state indicated by the scene corresponding to the selected scene icon; and
if the scene configuration button is selected, displaying on the display unit the scene configuration screen.

3. The method according to claim 2, wherein
the scene configuration button is a scene creation button, and
the control method of a mobile device includes:
in the displaying of the scene configuration screen, displaying the scene configuration screen if the scene creation button is selected; and
in the displaying of the new scene selection screen, displaying on the display unit the new scene selection screen including the one or more scene icons and the scene icon of the new scene.

4. The method according to claim 2, wherein
the scene configuration button is a scene edit button, and
the control method of a mobile device includes:
in the displaying of the scene configuration screen, displaying on the display unit the scene configuration screen if the scene edit button is selected while one scene icon from among the one or more scene icons is in a selected state; and
configuring the new scene by editing the scene corresponding to the selected scene icon.

5. The method according to claim 4, including
in the displaying of the new scene selection screen, displaying on the display unit the new scene selection screen including the scene icon of the new scene instead of the selected scene icon from among the one or more scene icons, or in addition to the one or more scene icons.

6. The method according to claim 3, wherein
a lighting state configured on the configuration screen before operations by the user is a lighting state indicated by a scene corresponding to a selected scene icon.

7. The control method of a mobile device according to claim 1, further comprising:
displaying on the display unit an activation button for activating the image capture unit when the configuration finish button is selected; and
in the activating of the image capture unit, activating the image capture unit when the activation button is selected.

8. The method according to claim 7, including
in the displaying of the activation button, displaying on the display unit a non-activate button for not activating the image capture unit together with the activate button; and
in the storing in the memory, storing a predetermined default image in the memory as the scene icon of the new scene if the non-activate button is selected.

9. The method according to claim 7, further comprising:
if the non-activate button is selected, displaying on the display unit a default image selection screen that includes a predetermined plurality of default images; and
in the storing in the memory, storing in the memory a default image selected from the plurality of default images as the scene icon of the new scene if the non-activate button is selected.

10. The method according to claim 8, including
in the displaying of the activation button, displaying on the display unit a comment for instructing the user to confirm whether or not conduct image capture by the image capture unit, together with the activate button and the non-activate button,
wherein the activate button is a button indicating agreement with the comment, and
the non-activate button is a button indicating disagreement with the comment.

11. The method according to claim 1, including
in the activating of the image capture unit, activating the image capture unit when the configuration finish button is selected.

12. The method according to claim 1, including
on the new scene selection screen, displaying the scene icon of the new scene in a selected state.

13. The method according to claim 1, further comprising:
displaying on the display unit an input screen enabling the user to input a scene name when the configuration finish button is selected; and in the storing in the memory, additionally storing in the memory a scene name input on the input screen as the scene name of the new scene.

14. The method according to claim 1, including
in the storing in the memory, if a plurality of images are acquired by the image capture unit, storing in the memory the plurality of images as scene icons of the new scene.

15. The method according to claim 13, including
on the new scene selection screen, displaying the plurality of images side-by-side as the scene icons.

16. The method according to claim 13, including
on the new scene selection screen, displaying the plurality of images at least partially overlapping as the scene icons.

17. The method according to claim 15, including
on the new scene selection screen, if a scroll operation on the plurality of images is detected, or if a predetermined period of time elapses, switching the image displayed farthest in front for another image from among the plurality of images.

18. A non-transitory computer readable medium storing a control program executed by a mobile device that controls one or more pieces of lighting equipment that illuminate a space, the mobile device including a display unit and an image capture unit, and the control program causing a computer of the mobile device to execute:

displaying on the display unit a scene configuration screen that includes a configuration screen for configuring a new scene indicating a new lighting state by the one or more pieces of lighting equipment, and a configuration finish button;

transmitting to the one or more pieces of lighting equipment a control signal for controlling the one or more pieces of lighting equipment on the basis of configuration information indicating a lighting state configured by user operations on the configuration screen;

activating the image capture unit after the configuration finish button is selected;

storing the configuration information from when the configuration finish button was selected in memory as configuration information for the new scene, and in addition, if an image is acquired by the image capture unit, storing the image in the memory as a scene icon of the new scene; and displaying on the display unit a new scene selection screen that includes the scene icon of the new scene.

* * * * *